(12) United States Patent
Ma

(10) Patent No.: US 11,167,819 B2
(45) Date of Patent: Nov. 9, 2021

(54) BICYCLE DERAILLEUR

(71) Applicant: SHIMANO (SINGAPORE) PTE. LTD., Jurong Town (SG)

(72) Inventor: Yun Ma, Jurong Town (SG)

(73) Assignee: SHIMANO (SINGAPORE) PTE. LTD., Jurong Town (SG)

( * ) Notice: Subject to any disclaimer, the term of this patent is extended or adjusted under 35 U.S.C. 154(b) by 418 days.

(21) Appl. No.: 16/169,985

(22) Filed: Oct. 24, 2018

(65) Prior Publication Data

US 2020/0130779 A1 Apr. 30, 2020

(51) Int. Cl.
*B62M 9/1248* (2010.01)
*B62M 9/126* (2010.01)
*B62M 9/125* (2010.01)

(52) U.S. Cl.
CPC .......... *B62M 9/1248* (2013.01); *B62M 9/125* (2013.01); *B62M 9/126* (2013.01)

(58) Field of Classification Search
CPC .............................. B62M 9/126; B62M 9/121
USPC ..................................................... 474/80, 82
See application file for complete search history.

(56) References Cited

U.S. PATENT DOCUMENTS

| 4,406,643 | A | | 9/1983 | Shimano | |
|---|---|---|---|---|---|
| 4,530,677 | A | * | 7/1985 | Nagano | B62M 9/126 474/80 |
| 8,202,182 | B2 | * | 6/2012 | Ishikawa | B62M 9/1348 474/82 |
| 8,852,041 | B2 | * | 10/2014 | Yamaguchi | B62M 9/126 474/80 |
| 8,870,692 | B2 | * | 10/2014 | Yamaguchi | B62M 9/126 474/80 |
| 8,870,693 | B2 | * | 10/2014 | Shahana | B62M 9/121 474/80 |
| 8,882,618 | B2 | * | 11/2014 | Yamaguchi | B62M 9/122 474/82 |
| 8,900,078 | B2 | * | 12/2014 | Yamaguchi | B62M 9/122 474/80 |
| 8,974,331 | B2 | * | 3/2015 | Yamaguchi | B62M 9/122 474/82 |

(Continued)

FOREIGN PATENT DOCUMENTS

| CN | 104554606 | | 4/2015 |
|---|---|---|---|
| CN | 206288184 | U | 6/2017 |
| TW | M520051 | U | 4/2016 |

*Primary Examiner* — Henry Y Liu
(74) *Attorney, Agent, or Firm* — Mori & Ward, LLP

(57) ABSTRACT

A bicycle derailleur comprises a base member, a movable member, a chain guide, and a resistance applying structure. The chain guide is rotatably coupled to the movable member about a pivot axis. The resistance applying structure includes a rotational one-way clutch and an elastic portion. The rotational one-way clutch includes a first engagement member and a second engagement member. The first engagement member has a first axially facing surface and a first engagement profile provided to the first axially facing surface. The second engagement member has a second axially facing surface and a second engagement profile provided to the second axially facing surface. The elastic portion is provided to at least one of the first axially facing surface of the first engagement member and the second axially facing surface of the second engagement member.

20 Claims, 36 Drawing Sheets

(56) References Cited

U.S. PATENT DOCUMENTS

| | | | |
|---|---|---|---|
| 9,005,059 B2* | 4/2015 | Suyama | B62M 9/122 474/82 |
| 2009/0054183 A1* | 2/2009 | Takachi | B62M 9/1248 474/80 |
| 2012/0083371 A1* | 4/2012 | Yamaguchi | B62M 9/126 474/80 |
| 2012/0083372 A1* | 4/2012 | Yamaguchi | B62M 9/126 474/80 |
| 2013/0288834 A1* | 10/2013 | Yamaguchi | B62M 9/1244 474/80 |
| 2013/0310204 A1* | 11/2013 | Shahana | B62M 9/121 474/80 |
| 2014/0162817 A1* | 6/2014 | Yamaguchi | B62M 9/122 474/80 |
| 2014/0213397 A1* | 7/2014 | Yamaguchi | B62K 23/04 474/80 |
| 2014/0371013 A1* | 12/2014 | Yamaguchi | B62M 9/16 474/122 |
| 2015/0031483 A1* | 1/2015 | Yamaguchi | B62M 9/126 474/80 |
| 2016/0046352 A1* | 2/2016 | Shipman | B62M 9/126 474/80 |
| 2016/0176478 A1* | 6/2016 | Chang | B62M 9/16 474/69 |
| 2016/0375959 A1* | 12/2016 | Calendrille, Jr. | B62M 9/1242 474/122 |
| 2017/0113760 A1* | 4/2017 | Lin | B62M 9/1248 |
| 2017/0174289 A1* | 6/2017 | Wu | B62M 9/16 |
| 2017/0343063 A1* | 11/2017 | Chan | B60B 27/047 |
| 2018/0148129 A1* | 5/2018 | Bernardele | B62M 9/1244 |
| 2018/0274623 A1* | 9/2018 | Brown | B62M 9/126 |
| 2018/0370598 A1* | 12/2018 | Chang | B62K 19/18 |
| 2019/0047660 A1* | 2/2019 | Yang | B62M 9/1248 |
| 2019/0063547 A1* | 2/2019 | Ziegler | B62M 9/126 |
| 2021/0039748 A1* | 2/2021 | Braedt | B62M 9/16 |
| 2021/0070396 A1* | 3/2021 | Garcia | B62M 9/126 |

* cited by examiner

BICYCLE DERAILLEUR

BACKGROUND OF THE INVENTION

Field of the Invention

The present invention relates to a bicycle derailleur.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a derailleur.

SUMMARY OF THE INVENTION

In accordance with a first aspect of the present invention, a bicycle derailleur comprises a base member, a movable member, a chain guide, and a resistance applying structure. The base member is configured to be mounted to a bicycle frame. The movable member is movably coupled to the base member. The chain guide is rotatably coupled to the movable member about a pivot axis. The resistance applying structure is configured to apply rotational resistance to the chain guide. The resistance applying structure includes a rotational one-way clutch and an elastic portion. The rotational one-way clutch includes a first engagement member and a second engagement member. The first engagement member and the second engagement member are configured to be rotatable about the pivot axis. The first engagement member has a first axially facing surface and a first engagement profile provided to the first axially facing surface. The second engagement member has a second axially facing surface and a second engagement profile provided to the second axially facing surface. The first engagement profile and the second engagement profile are configured to engage with each other in an engagement state of the first engagement member and the second engagement member. The first axially facing surface and the second axially facing surface are configured to face each other in an axial direction with respect to the pivot axis. The elastic portion is provided to at least one of the first axially facing surface of the first engagement member and the second axially facing surface of the second engagement member.

With the bicycle derailleur according to the first aspect, the elastic portion can smooth a relative rotation between the first engagement member and the second engagement member and/or can reduce shock in the engagement state and/or during the relative rotation.

In accordance with a second aspect of the present invention, the bicycle derailleur according to the first aspect is configured so that the first engagement profile includes at least one first engagement pawl. The second engagement profile includes at least one second engagement pawl configured to engage with the at least one first engagement pawl. The elastic portion is provided to the at least one first engagement pawl.

With the bicycle derailleur according to the second aspect, it is possible to improve flexibility of the at least one first engagement pawl. This can smooth the relative rotation between the first engagement member and the second engagement member and/or can reduce shock in the engagement state and/or during the relative rotation.

In accordance with a third aspect of the present invention, the bicycle derailleur according to the second aspect is configured so that the at least one first engagement pawl includes a plurality of first engagement pawls.

With the bicycle derailleur according to the third aspect, it is possible to increase a maximum rotational force that the first engagement profile can receive from the second engagement profile in the engagement state.

In accordance with a fourth aspect of the present invention, the bicycle derailleur according to the third aspect is configured so that at least one pawl of the plurality of first engagement pawls engages with the at least one second engagement pawl in the engagement state of the first engagement member and the second engagement member. Another pawl of the plurality of first engagement pawls is free of an engagement with the at least one second engagement pawl in the engagement state of the first engagement member and the second engagement member.

With the bicycle derailleur according to the fourth aspect, it is possible to decrease a rotational angle between the first engagement member and the second engagement member from one engagement state to another engagement state.

In accordance with a fifth aspect of the present invention, the bicycle derailleur according to any one of the second to fourth aspects is configured so that the at least one second engagement pawl includes a plurality of second engagement pawls.

With the bicycle derailleur according to the fifth aspect, it is possible to increase a maximum rotational force that the second engagement profile can receive from the first engagement profile in the engagement state.

In accordance with a sixth aspect of the present invention, the bicycle derailleur according to any one of the third to fifth aspects is configured so that the at least one second engagement pawl includes a plurality of second engagement pawls. A total number of the plurality of first engagement pawls is smaller than a total number of the plurality of second engagement pawls.

With the bicycle derailleur according to the sixth aspect, it is possible to improve flexibility of designing the first engagement profile.

In accordance with a seventh aspect of the present invention, the bicycle derailleur according to any one of the first to sixth aspects is configured so that the first engagement member has an annular shape. The second engagement member has an annular shape.

With the bicycle derailleur according to the seventh aspect, it is possible to make the shapes of the first engagement member and the second engagement member suitable for rotation.

In accordance with an eighth aspect of the present invention, the bicycle derailleur according to any one of the first to seventh aspects is configured so that the first engagement profile includes a plurality of first engagement pawls. The plurality of first engagement pawls is spaced apart from each other in a circumferential direction with respect to the pivot axis.

With the bicycle derailleur according to the eighth aspect, it is possible to distribute a rotational force applied to the first engagement member to the plurality of first engagement pawls. This can improve durability of the first engagement member.

In accordance with a ninth aspect of the present invention, the bicycle derailleur according to the eighth aspect is configured so that the plurality of first engagement pawls is equally spaced apart from each other in the circumferential direction with respect to the pivot axis.

With the bicycle derailleur according to the ninth aspect, it is possible to effectively distribute the rotational force applied to the first engagement member to the plurality of first engagement pawls. This can improve durability of the first engagement member.

In accordance with a tenth aspect of the present invention, the bicycle derailleur according to the ninth aspect is configured so that a total number of the plurality of first engagement pawls is an even number.

With the bicycle derailleur according to the tenth aspect, it is possible to effectively distribute the rotational force applied to the first engagement member to the plurality of first engagement pawls. This can improve durability of the first engagement member.

In accordance with an eleventh aspect of the present invention, the bicycle derailleur according to any one of the first to tenth aspects is configured so that the first engagement member includes a first base body including the first axially facing surface. The first engagement profile includes at least one first engagement pawl. The at least one first engagement pawl is integrally provided with the first base body as a one-piece unitary member.

With the bicycle derailleur according to the eleventh aspect, it is possible to improve productivity of the first engagement member.

In accordance with a twelfth aspect of the present invention, the bicycle derailleur according to any one of the first to eleventh aspects is configured so that the resistance applying structure includes a resistance applying member configured to apply rotational resistance to the second engagement member.

With the bicycle derailleur according to the twelfth aspect, it is possible to apply the rotational resistance to the chain guide in the engagement state.

In accordance with a thirteenth aspect of the present invention, the bicycle derailleur according to the twelfth aspect is configured so that the resistance applying structure includes a resistance control member configured to be operatively coupled to the resistance applying member so as to change the rotational resistance applied from the resistance applying member.

With the bicycle derailleur according to the thirteenth aspect, it is possible to change the rotational resistance applied to the chain guide using the resistance control member.

In accordance with a fourteenth aspect of the present invention, the bicycle derailleur according to the thirteenth aspect is configured so that the resistance applying member is configured to apply first rotational resistance to the second engagement member in a first state where the resistance control member is in a first position. The resistance applying member is configured to apply second rotational resistance to the second engagement member in a second state where the resistance control member is in a second position different from the first position, the second rotational resistance being different from the first rotational resistance.

With the bicycle derailleur according to the fourteenth aspect, it is possible to change the rotational resistance applied to the chain guide by changing the position of the resistance control member.

In accordance with a fifteenth aspect of the present invention, the bicycle derailleur according to the thirteenth or fourteenth aspect is configured so that the resistance control member configured to gradually change the rotational resistance applied by the resistance applying member as a position of the resistance control member varies.

With the bicycle derailleur according to the fifteenth aspect, it is possible to gradually change the rotational resistance applied to the chain guide by changing the position of the resistance control member.

In accordance with a sixteenth aspect of the present invention, the bicycle derailleur according to any one of the second to fifteenth aspects is configured so that the at least one first engagement pawl protrudes toward the second engagement member in the axial direction.

With the bicycle derailleur according to the sixteenth aspect, it is possible to reliably bring the at least one first engagement pawl into engagement with the at least one second engagement pawl in the engagement state.

In accordance with a seventeenth aspect of the present invention, the bicycle derailleur according to any one of the second to sixteenth aspects is configured so that the at least one first engagement pawl is elastically deformed by a first deformation amount in the axial direction while the chain guide rotates relative to the movable member in a first rotational direction about the pivot axis. The at least one first engagement pawl is elastically deformed by a second deformation amount in the axial direction while the chain guide rotates relative to the movable member in a second rotational direction about the pivot axis. The first rotational direction is a reverse direction of the second rotational direction in a circumferential direction with respect to the pivot axis. The first deformation amount is larger than the second deformation amount.

With the bicycle derailleur according to the seventeenth aspect, the rotational one-way clutch allows the chain guide to rotate relative to the second engagement member in the first rotational direction about the pivot axis while restricting the chain guide from rotating relative to the second engagement member in the second rotational direction about the pivot axis.

In accordance with an eighteenth aspect of the present invention, the bicycle derailleur according to the seventeenth aspect is configured so that the at least one first engagement pawl is elastically deformed by the at least one second engagement pawl while the chain guide rotates relative to the movable member in the first rotational direction about the pivot axis.

With the bicycle derailleur according to the eighteenth aspect, it is possible to smooth the rotation of the chain guide while the rotational one-way clutch restricts the chain guide from rotating relative to the second engagement member in the second rotational direction about the pivot axis.

In accordance with a nineteenth aspect of the present invention, the bicycle derailleur according to any one of the second to eighteenth aspects is configured so that a total number of the at least one second engagement pawl is equal to or larger than 15 and is equal to or smaller than 40.

With the bicycle derailleur according to the nineteenth aspect, it is possible to effectively increase the maximum rotational force that the second engagement profile can receive from the first engagement profile in the engagement state.

In accordance with a twentieth aspect of the present invention, the bicycle derailleur according to any one of the second to nineteenth aspects is configured so that a total number of the at least one first engagement pawl is equal to or larger than one and is equal to or smaller than eight.

With the bicycle derailleur according to the twentieth aspect, it is possible to effectively increase the maximum rotational force that the first engagement profile can receive from the second engagement profile in the engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
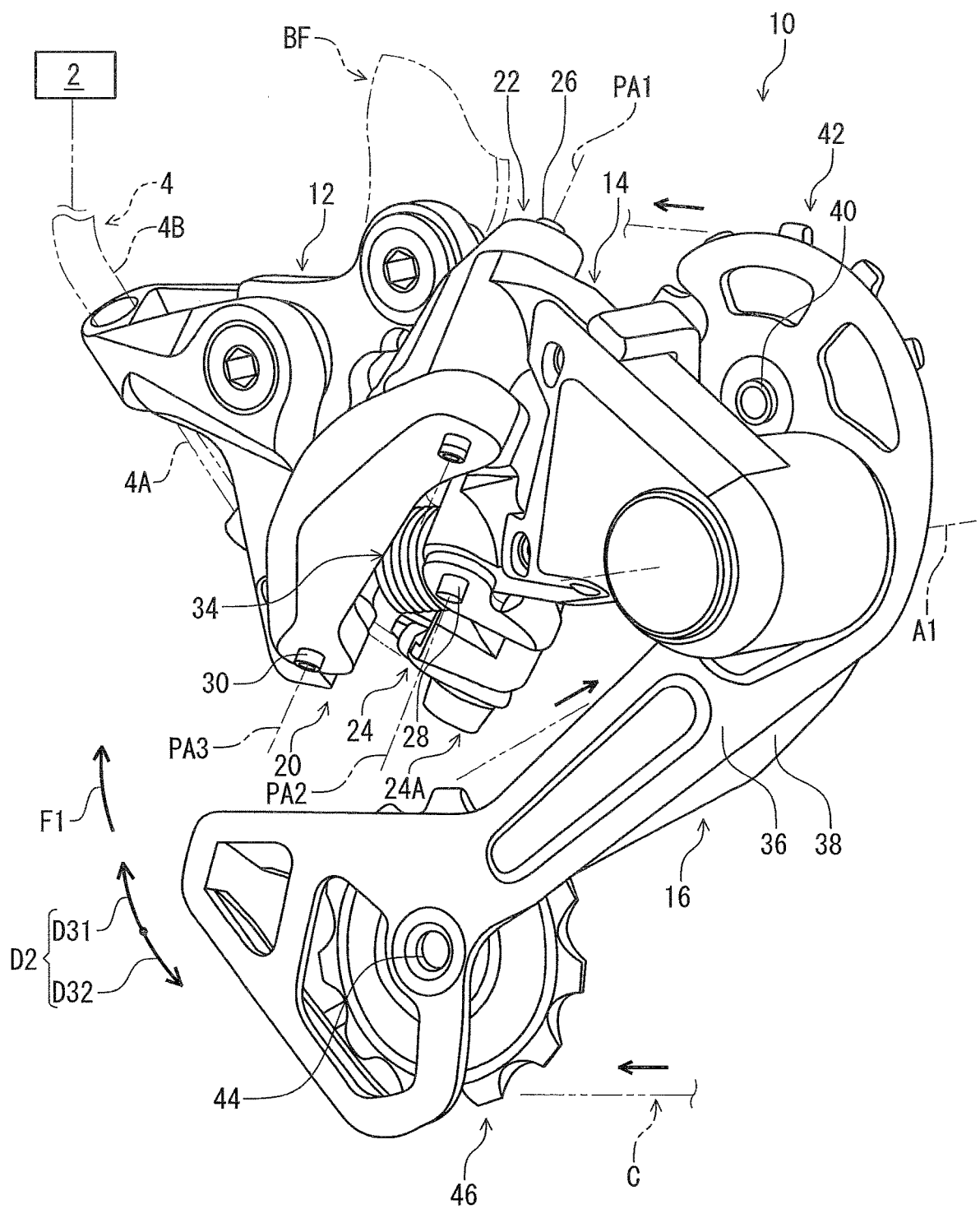
FIG. 1 is a perspective view of a bicycle derailleur in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle derailleur 10 in accordance with a first embodiment comprises a base member 12, a movable member 14, and a chain guide 16. The base member 12 is configured to be mounted to a bicycle frame BF. The movable member 14 is movably coupled to the base member 12. The chain guide 16 is rotatably coupled to the movable member 14 about a pivot axis A1. The chain guide 16 is configured to shift a bicycle chain C relative to a bicycle sprocket arrangement (not shown). The bicycle derailleur 10 is configured to be connected to a bicycle operating device 2 with a control cable 4. The bicycle derailleur 10 is configured to shift the bicycle chain C relative to the bicycle sprocket arrangement in response to an operation from the bicycle operating device 2. In this embodiment, the bicycle derailleur 10 is a rear derailleur. However, the structure of the bicycle derailleur 10 can apply to a front derailleur or other derailleurs.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle of a bicycle with facing a handlebar. Accordingly, these terms, as utilized to describe the bicycle derailleur 10, should be interpreted relative to the bicycle equipped with the bicycle derailleur 10 as used in an upright riding position on a horizontal surface.

The bicycle derailleur 10 includes a linkage structure 20 configured to movably couple the movable member 14 to the base member 12. The linkage structure 20 includes a first link 22, a second link 24, a first link pin 26, a second link pin 28, and a third link pin 30. The first link pin 26 defines a first link axis LA1. The second link pin 28 defines a second link axis LA2. The third link pin 30 defines a third link axis LA3. The first link axis LA1, the second link axis LA2, and the third link axis LA3, and the fourth link axis LA4 are parallel to or substantially parallel to each other.

The chain guide 16 is pivotally coupled to the movable member 14 about the pivot axis A1. The first link pin 26 pivotally couples the first link 22 to the base member 12 about the first link axis LA1. The second link pin 28 pivotally couples the second link 24 to the movable member 14 about the second link axis LA2. The third link pin 30 pivotally couples the first link 22 to the base member 12 about the third link axis LA3. The structures of the movable member 14 and the linkage structure 20 are not limited to this embodiment.

The bicycle derailleur 10 comprises a link biasing member 34. The link biasing member 34 is mounted to the linkage structure 20. The link biasing member 34 is coupled to the third link pin 30 and the second link 24. The link biasing member 34 can be coupled to other members (e.g., the first link 22 and the second link 24). The second link 24 includes a wire attachment part 24A. An inner wire 4A of the control cable 4 is attached to the wire attachment part 24A. The control cable 4 includes an outer tube 4B attached to the base member 12. The inner wire 4A is movably provided in the outer tube 4B. The movable member 14 is held in one of shifting positions by the inner wire 4A of the control cable 4 and a biasing force of the link biasing member 34.

The chain guide 16 comprises a first guide plate 36, a second guide plate 38, a first pulley axle 40, a first pulley 42, a second pulley axle 44, and a second pulley 46. The first pulley 42 is rotatably coupled to the first guide plate 36 and the second guide plate 38 with the first pulley axle 40. The second pulley 46 is rotatably coupled to the first guide plate 36 and the second guide plate 38 with the second pulley axle 44. The first pulley 42 and the second pulley 46 are engaged with the bicycle chain C.

Figure 2:
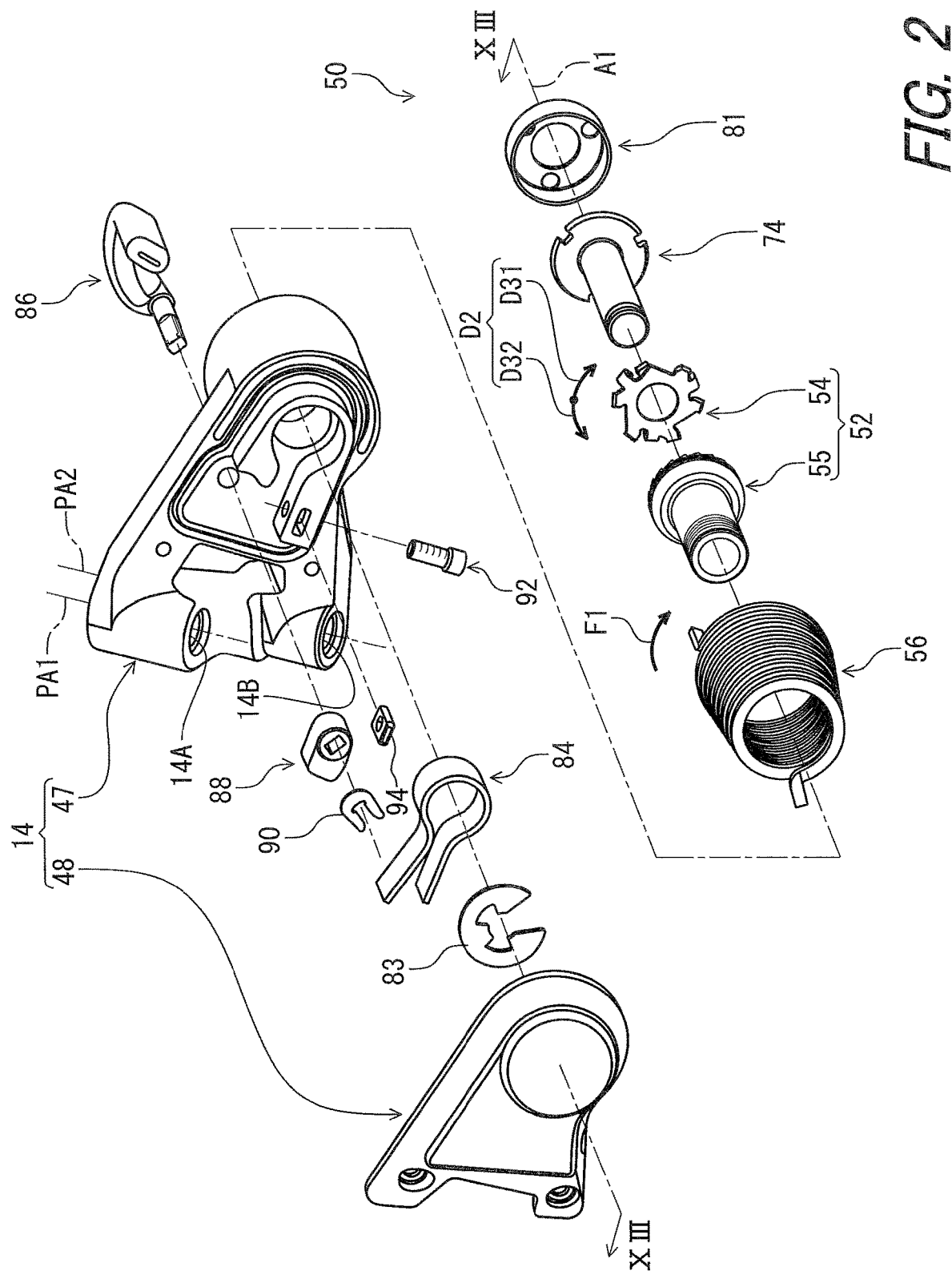
FIG. 2 is an exploded perspective view of a resistance applying structure of the bicycle derailleur illustrated in FIG. 1.

As seen in FIG. 2, the movable member 14 includes a movable body 47 and a cover body 48. The cover body 48 is secured to the movable body 47 with fasteners such as screws. The movable member 14 includes a first pivot hole 14A and a second pivot hole 14B. The first link pin 26 (FIG. 1) extends through the first pivot hole 14A. The second link pin 28 (FIG. 1) extends through the second pivot hole 14B.

The bicycle derailleur 10 comprises a resistance applying structure 50. The resistance applying structure 50 is configured to apply rotational resistance to the chain guide 16 (FIG. 1). The resistance applying structure 50 includes a rotational one-way clutch 52. The rotational one-way clutch 52 includes a first engagement member 54 and a second engagement member 55. The first engagement member 54 and the second engagement member 55 are configured to be rotatable about the pivot axis A1.

The first engagement member 54 is rotatable relative to the movable member 14 about the pivot axis A1. The second engagement member 55 is rotatable relative to the movable member 14 about the pivot axis A1. The rotational one-way clutch 52 allows the first engagement member 54 to rotate relative to the second engagement member 55 and the movable member 14 in a first rotational direction D31 about the pivot axis A1. The rotational one-way clutch 52 restricts the first engagement member 54 from rotating relative to the second engagement member 55 in a second rotational direction D32 about the pivot axis A1. Thus, the first engagement member 54 rotates along with the second engagement member 55 relative to the movable member 14 about the pivot axis A1. The first rotational direction D31 is a reverse direction of the second rotational direction D32 in a circumferential direction D2 with respect to the pivot axis A1.

As seen in FIG. 1, the tension of the bicycle chain C increases when the chain guide 16 rotates relative to the movable member 14 in the first rotational direction D31 about the pivot axis A1. The tension of the bicycle chain C decreases when the chain guide 16 rotates relative to the movable member 14 in the second rotational direction D32 about the pivot axis A1. The resistance applying structure 50 (FIG. 2) is configured to apply the rotational resistance to the second engagement member 55 when the chain guide 16 rotates relative to the movable member 14 in each of the first rotational direction D31 and the second rotational direction D32 about the pivot axis A1.

To suppress the decrease in the tension of the bicycle chain C, the resistance applying structure 50 (FIG. 2) applies the rotational resistance to the chain guide 16 via the rotational one-way clutch 52 (FIG. 2) in the first rotational direction D31 when the chain guide 16 rotates relative to the movable member 14 in the second rotational direction D32 about the pivot axis A1. Furthermore, as seen in FIG. 2, the resistance applying structure 50 includes a rotational biasing member 56 to bias the chain guide 16 (FIG. 1) relative to the movable member 14 (FIG. 2) about the pivot axis A1 in the first rotational direction D31. The rotational biasing member 56 applies a rotational biasing force F1 to the chain guide 16 in the first rotational direction D31.

Figure 3:
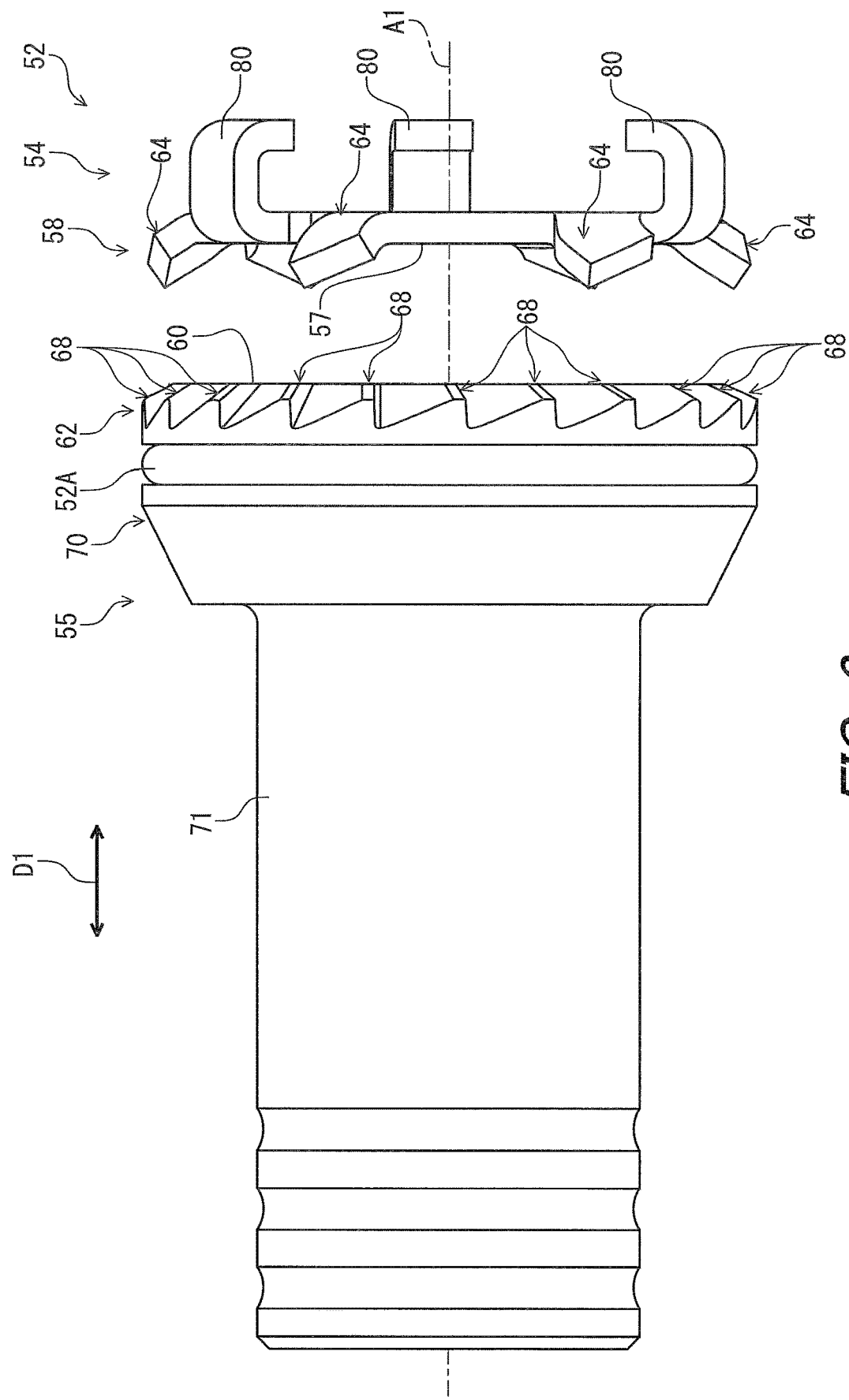
FIG. 3 is an exploded front view of a rotational one-way clutch of the resistance applying structure illustrated in FIG. 2.

As seen in FIG. 3, the first engagement member 54 has a first axially facing surface 57 and a first engagement profile 58 provided to the first axially facing surface 57. The second engagement member 55 has a second axially facing surface 60 and a second engagement profile 62 provided to the second axially facing surface 60. The first axially facing surface 57 and the second axially facing surface 60 are configured to face each other in an axial direction D1 with respect to the pivot axis A1.

Figure 4:
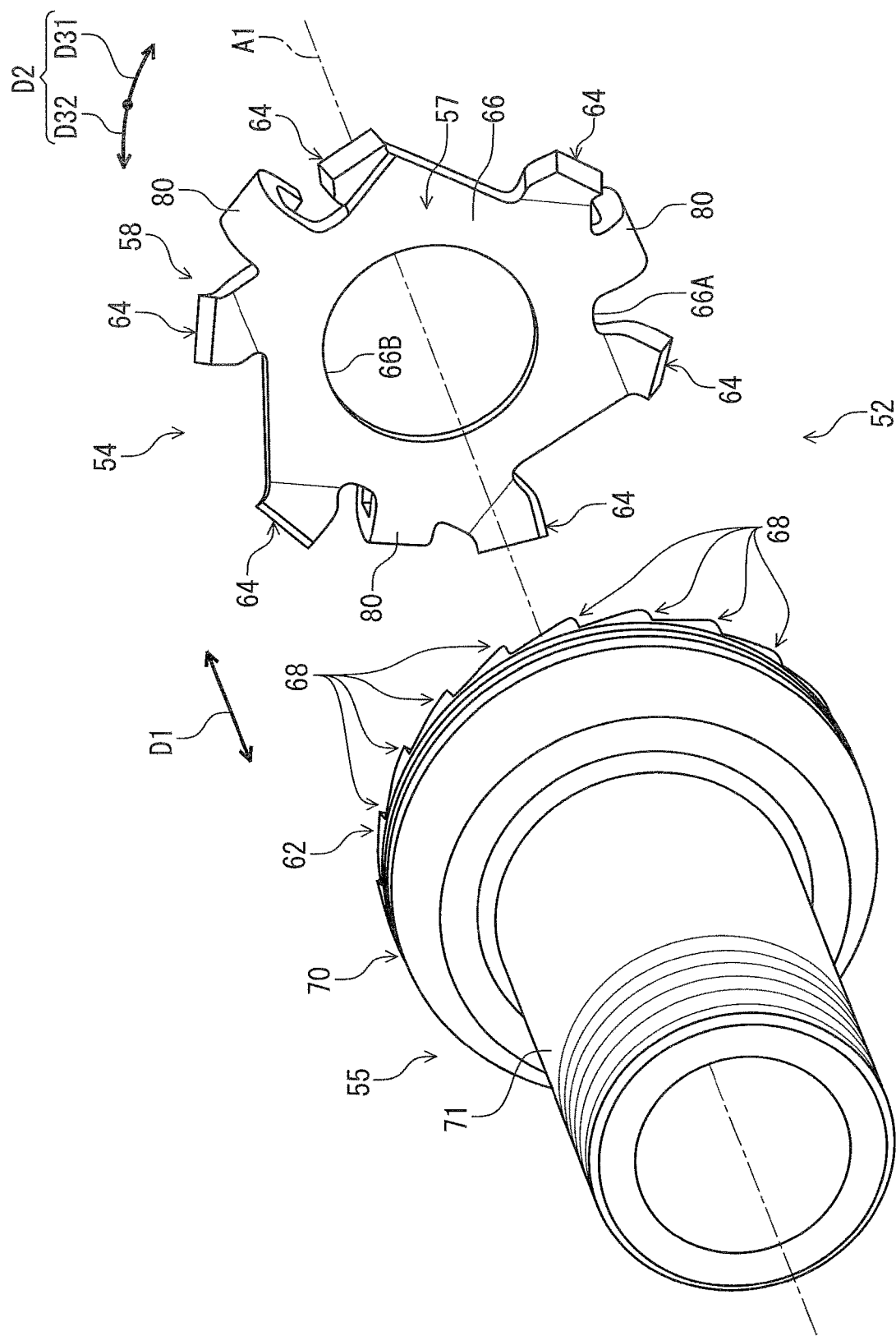
FIG. 4 is an exploded perspective view of the rotational one-way clutch of the resistance applying structure illustrated in FIG. 2.

As seen in FIG. 4, the first engagement member 54 has an annular shape. The first engagement profile 58 includes at least one first engagement pawl 64. The at least one first engagement pawl 64 includes a plurality of first engagement pawls 64. Namely, the first engagement profile 58 includes the plurality of first engagement pawls 64. In this embodiment, a total number of the plurality of first engagement pawls 64 is an even number. The total number of the at least one first engagement pawl 64 is equal to or larger than one and is equal to or smaller than eight. The total number of the at least one first engagement pawl 64 is equal to or larger than two. The total number of the at least one first engagement pawl 64 is equal to or smaller than six. In this embodiment, the total number of the at least one first engagement pawl 64 is six. However, the total number of the plurality of first engagement pawls 64 is not limited to this embodiment and the above ranges. The total number of the plurality of first engagement pawls 64 can be an odd number.

The first engagement member 54 includes a first base body 66 including the first axially facing surface 57. The first base body 66 has an annular shape provided about the pivot axis A1. The first base body 66 includes a first outer periphery 66A and an opening 66B. The first engagement pawl 64 extends radially outwardly from the first outer periphery 66A of the first base body 66.

The plurality of first engagement pawls 64 is spaced apart from each other in a circumferential direction D2 with respect to the pivot axis A1. In this embodiment, the plurality of first engagement pawls 64 is equally spaced apart from each other in the circumferential direction D2 with respect to the pivot axis A1. However, the arrangement of the first engagement pawls 64 is not limited to this embodiment.

As seen in FIG. 3, the at least one first engagement pawl 64 protrudes toward the second engagement member 55 in the axial direction D1. The first engagement pawl 64 extends from the first outer periphery 66A of the first base body 66 toward the second engagement member 55 in the axial direction D1. The first engagement pawl 64 protrudes from the first base body 66 beyond the first axially facing surface 57 toward the second engagement member 55 in the axial direction D1.

In this embodiment, the at least one first engagement pawl 64 is integrally provided with the first base body 66 as a one-piece unitary member. The first engagement member 54 is made of a metallic material. However, the first engagement member 54 can be made of a non-metallic material such as resin. The first engagement pawl 64 can be a separate member from the first base body 66 and coupled to the first base body 66 with a joining structure such as welding or adhesive.

Figure 5:
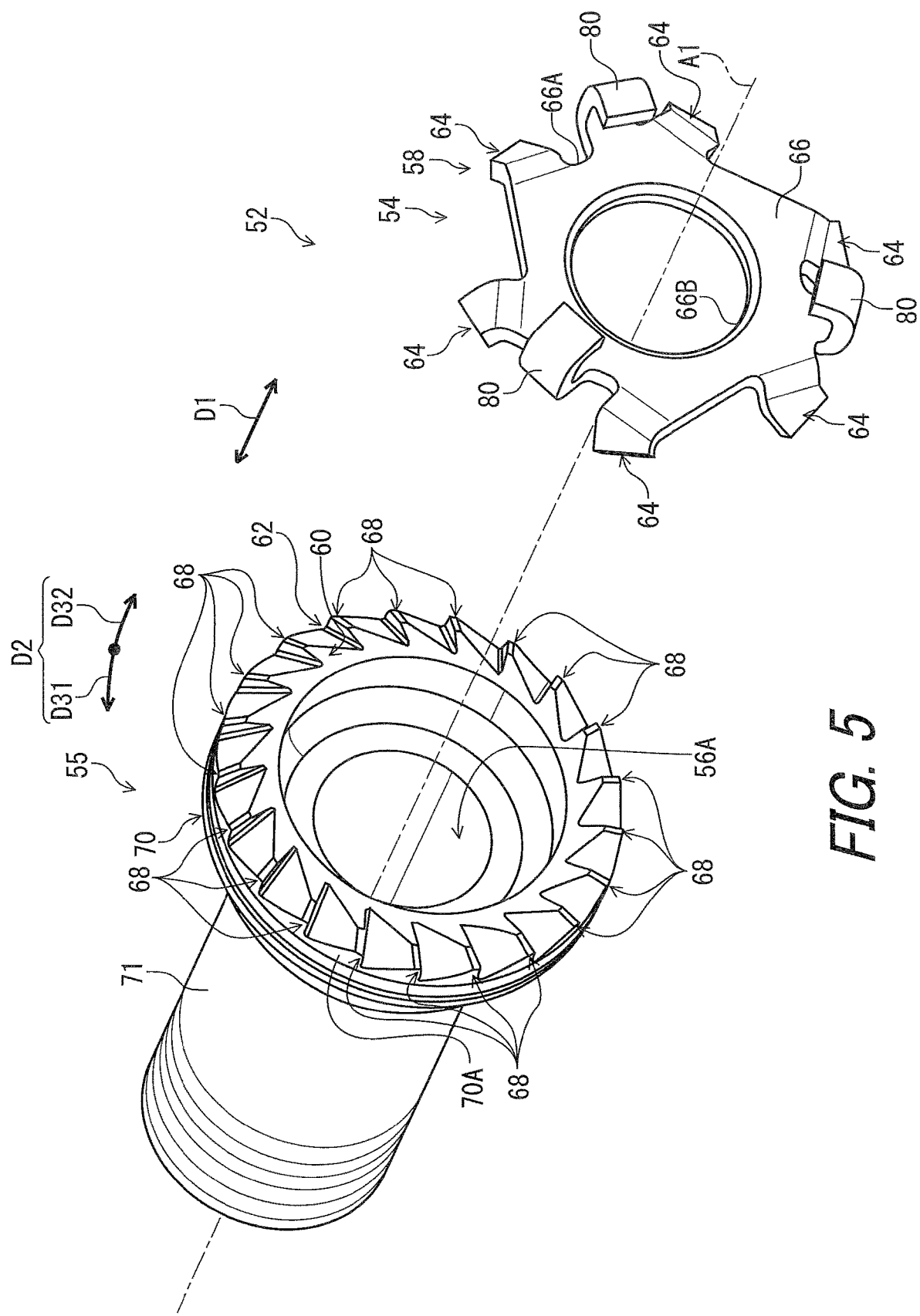
FIG. 5 is another exploded perspective view of the rotational one-way clutch of the resistance applying structure illustrated in FIG. 2.

As seen in FIG. 5, the second engagement member 55 has an annular shape. The second engagement profile 62 includes at least one second engagement pawl 68 configured to engage with the at least one first engagement pawl 64. The at least one second engagement pawl 68 includes a plurality of second engagement pawls 68. In this embodiment, a total number of the plurality of second engagement pawls 68 is an odd number. The total number of the at least one second engagement pawl 68 is equal to or larger than 20 and is equal to or smaller than 40. The total number of the at least one second engagement pawl 68 is equal to or larger than 15 and is equal to or smaller than 40. The total number of the at least one second engagement pawl 68 is equal to or smaller than 36. The total number of the at least one second engagement pawl 68 is equal to or smaller than 34. In this embodiment, the total number of the second engagement pawls 68 is 21. However, the total number of the second engagement pawls 68 is not limited to this embodiment and the above range. The total number of the plurality of second engagement pawls 68 can be an even number.

In this embodiment, the total number of the plurality of first engagement pawls 64 is smaller than the total number of the plurality of second engagement pawls 68. However, the total number of the plurality of first engagement pawls 64 can be equal to or larger than the total number of the plurality of second engagement pawls 68.

The second engagement member 55 includes a second base body 70 including the second axially facing surface 60. The second base body 70 has an annular shape provided about the pivot axis A1. The second base body 70 includes a second outer periphery 70A. The plurality of second engagement pawls 68 is provided radially between the second outer periphery 70A and the pivot axis A1. However, the second engagement pawl 68 can be provided to extend radially outwardly from the second outer periphery 70A.

The plurality of second engagement pawls 68 is spaced apart from each other in the circumferential direction D2 with respect to the pivot axis A1. In this embodiment, the plurality of second engagement pawls 68 is equally spaced apart from each other in the circumferential direction D2 with respect to the pivot axis A1. The second engagement pawl 68 radially extends from the second axially facing surface 60 to the second outer periphery 70A of the second base body 70. However, the arrangement of the second engagement pawls 68 is not limited to this embodiment.

The second engagement member 55 includes a support tube 71 extending from the second base body 70 toward an opposite side of the first engagement member 54 in the axial direction D1. The second engagement member 55 includes a through-hole 55A extending along the pivot axis A1.

In this embodiment, the second engagement pawl 68 and the support tube 71 are integrally provided with the second base body 70 as a one-piece unitary member. The second engagement member 55 is made of a metallic material. However, the second engagement member 55 can be made of a non-metallic material such as resin. At least one of the second engagement pawl 68 and the support tube 71 can be a separate member from the second base body 70 and coupled to the second base body 70 with a joining structure such as welding or adhesive.

Figure 6:
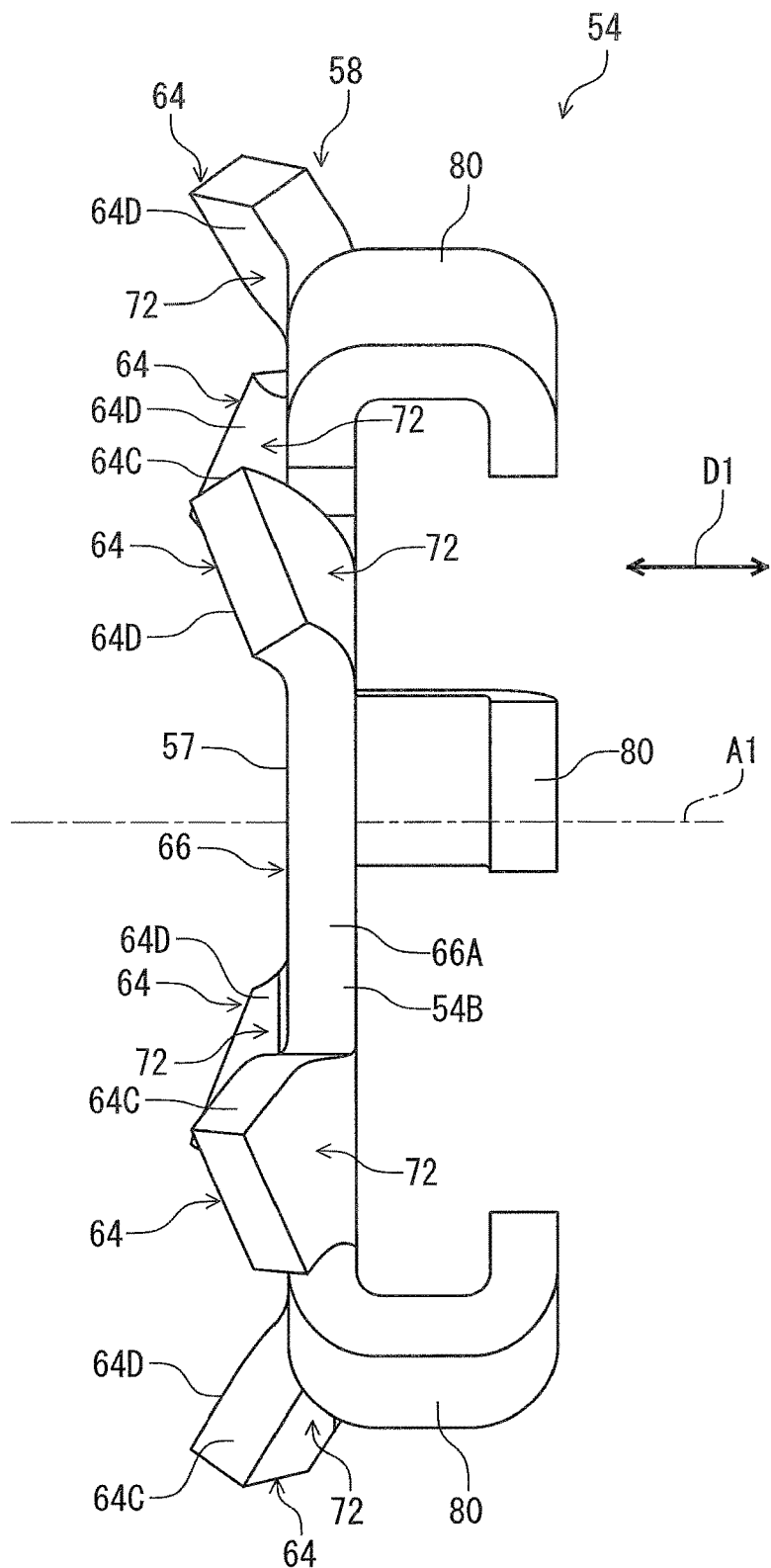
FIG. 6 is a front view of the rotational one-way clutch of the resistance applying structure illustrated in FIG. 2.

As seen in FIG. 6, the rotational one-way clutch 52 includes an elastic portion 72. The elastic portion 72 is provided to at least one of the first axially facing surface 57 of the first engagement member 54 and the axially facing surface 60 of the second engagement member 55. In this embodiment, the elastic portion 72 is provided to the at least one first engagement pawl 64. The elastic portion 72 is provided to the plurality of first engagement pawls 64. The first engagement pawl 64 is elastically deformable in the axial direction D1. The first engagement pawl 264 can be the same as the elastic portion 72. However, the elastic portion 72 can be provided to the second engagement pawl 68 (FIG. 5) or both the first engagement pawl 64 and the second engagement pawl 68 (FIG. 5).

Figure 7:
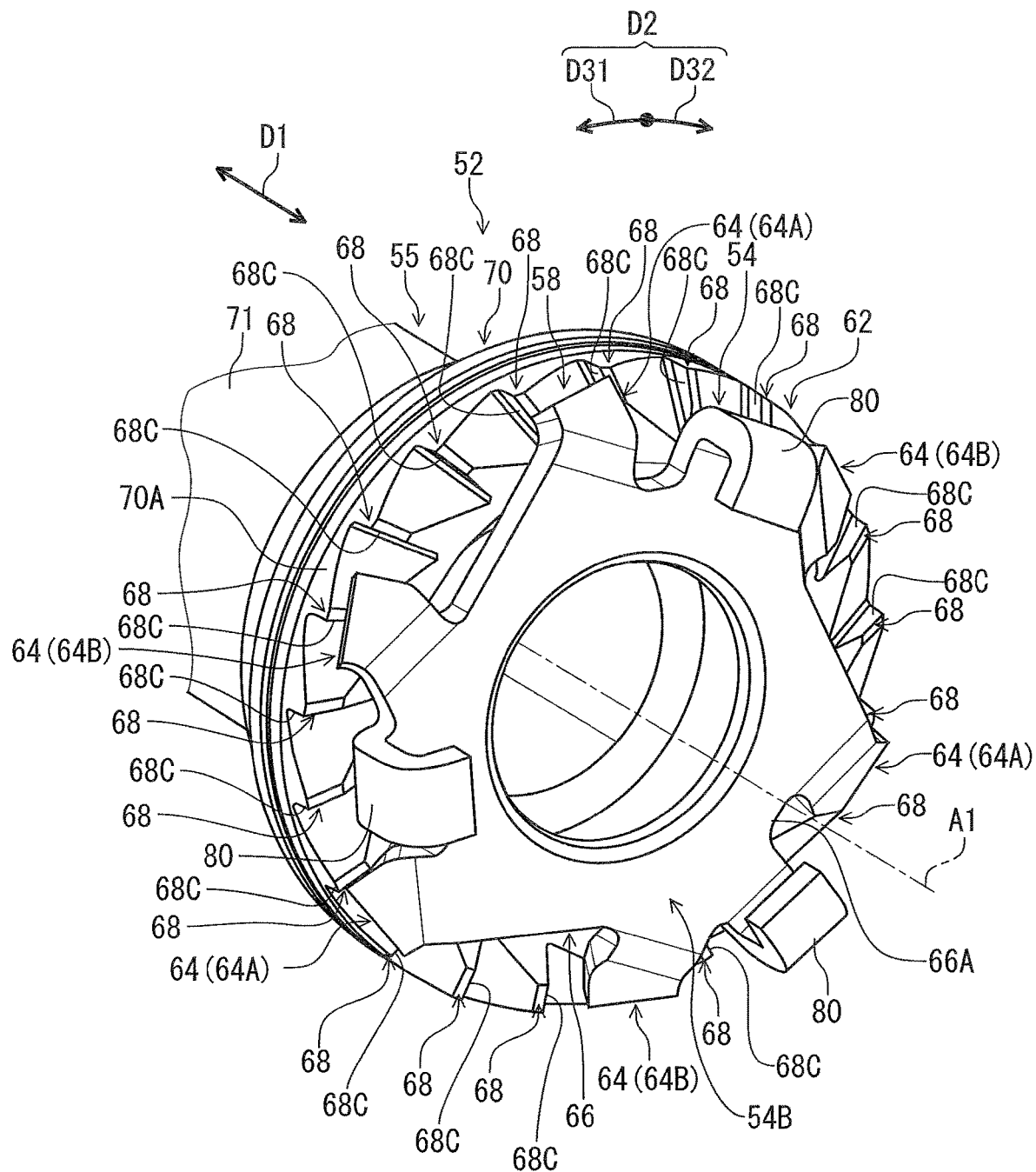
FIG. 7 is a partial perspective view of the rotational one-way clutch of the resistance applying structure illustrated in FIG. 2.
Figure 8:
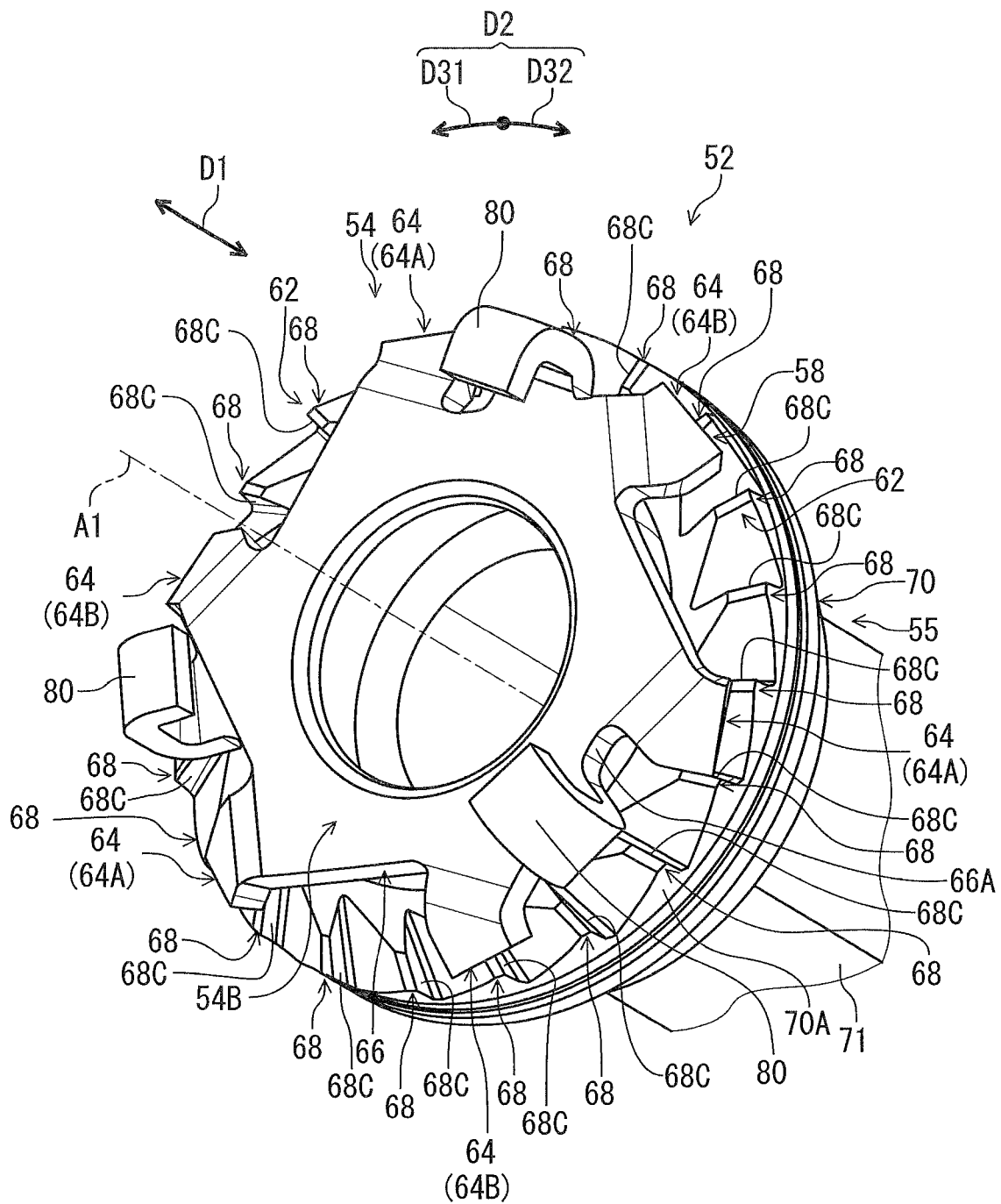
FIG. 8 is another partial perspective view of the rotational one-way clutch of the resistance applying structure illustrated in FIG. 2.

As seen in FIGS. 7 and 8, the first engagement profile 58 and the second engagement profile 62 are configured to engage with each other in an engagement state of the first engagement member 54 and the second engagement member 55. In the engagement state of the first engagement member 54 and the second engagement member 55, the first engagement member 54 is restricted from rotating relative to the second engagement member 55 in the second rotational direction D32 about the pivot axis A1.

In this embodiment, at least one pawl of the plurality of first engagement pawls 64 engages with the at least one second engagement pawl 68 in the engagement state of the first engagement member 54 and the second engagement member 55. Another pawl of the plurality of first engagement pawls 64 is free of an engagement with the at least one second engagement pawl 68 in the engagement state of the first engagement member 54 and the second engagement member 55.

Specifically, three pawls of the plurality of first engagement pawls 64 engages with three pawls of the plurality of second engagement pawls 68 in the engagement state of the first engagement member 54 and the second engagement member 55. Another three pawls of the plurality of first engagement pawls 64 are free of an engagement with another 18 pawls of the plurality of second engagement pawls 68 in the engagement state of the first engagement member 54 and the second engagement member 55.

Figure 9:
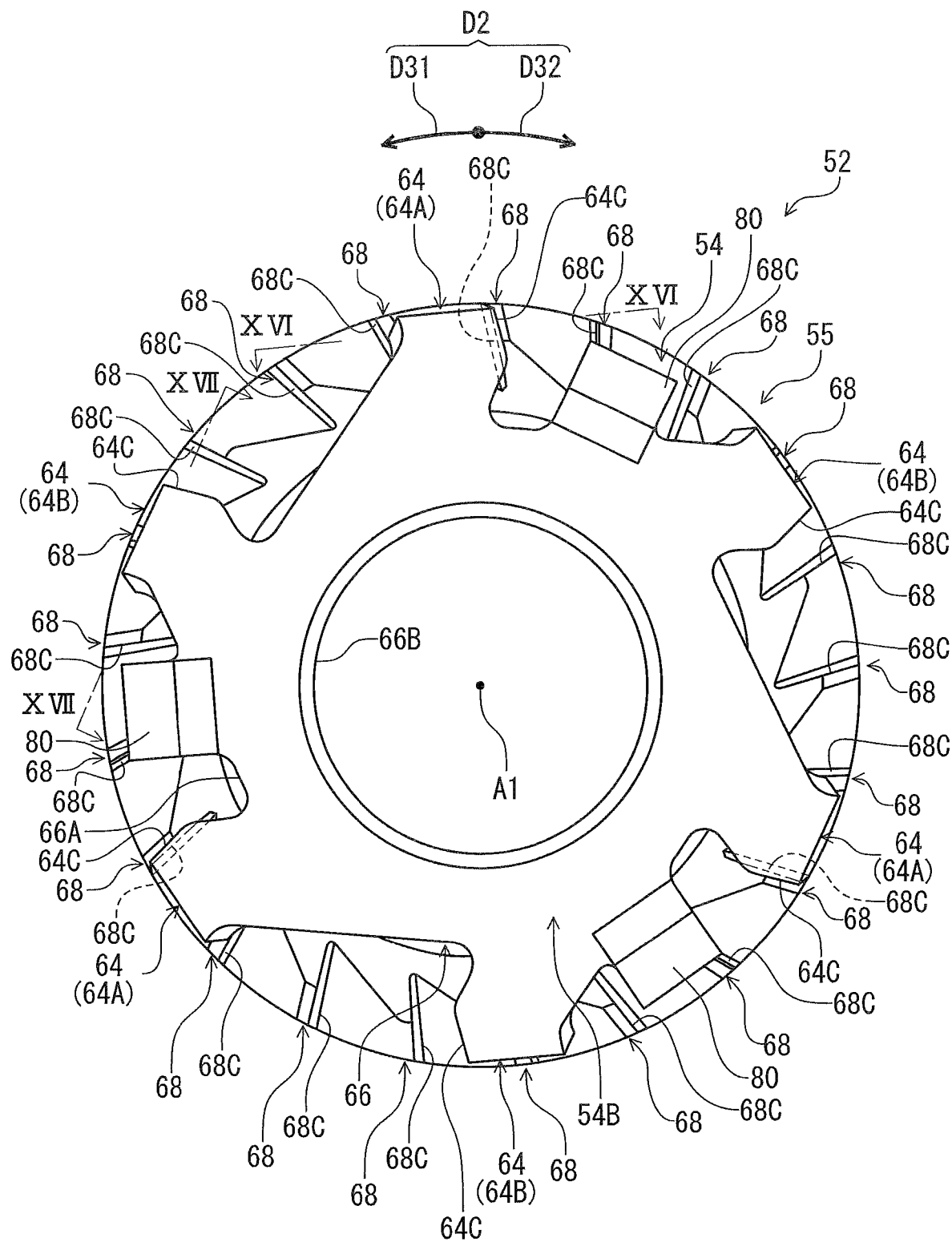
FIG. 9 is a side elevational view of the rotational one-way clutch of the resistance applying structure illustrated in FIG. 2 (first engagement state).
Figure 10:
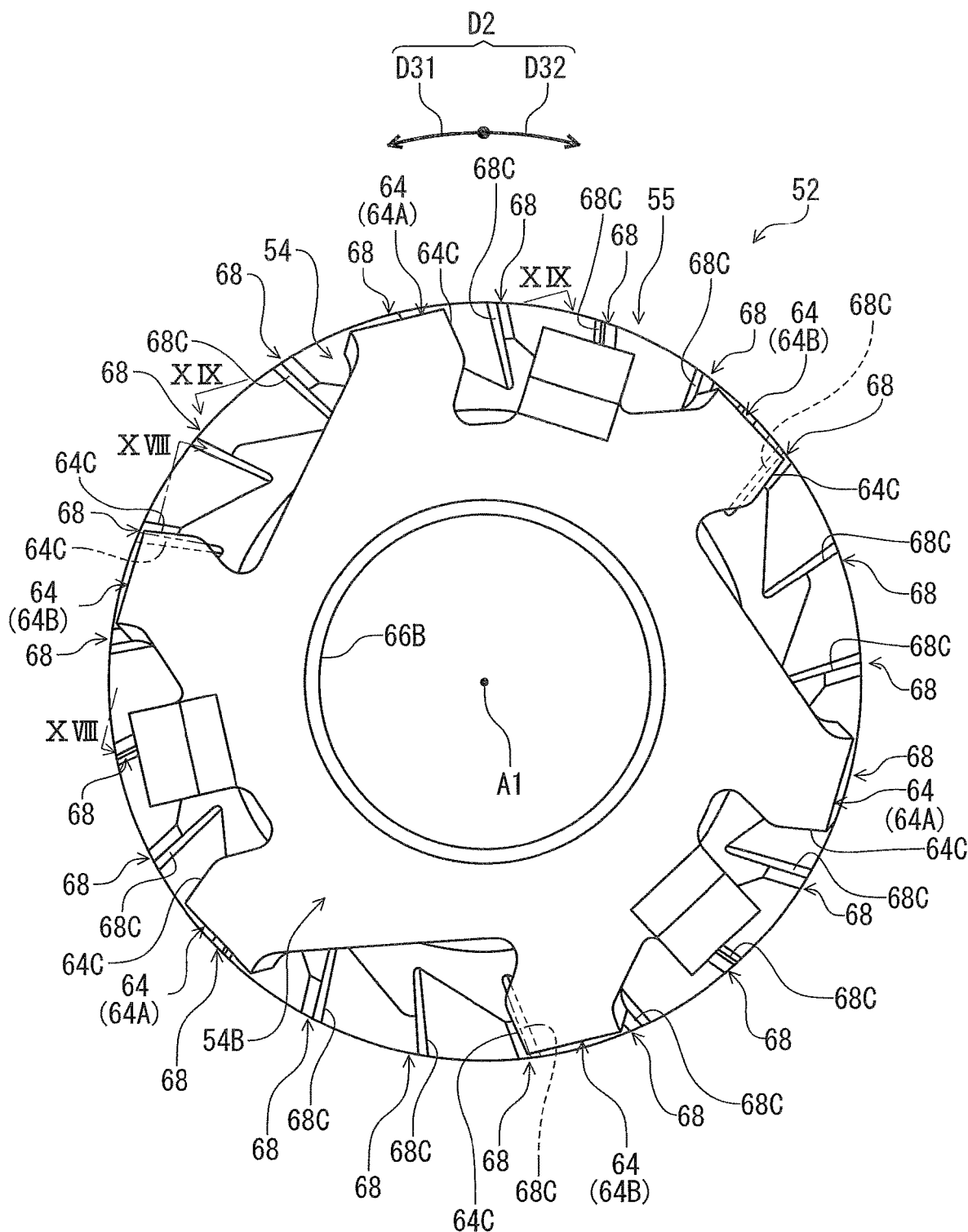
FIG. 10 is a side elevational view of the rotational one-way clutch of the resistance applying structure illustrated in FIG. 2 (second engagement state).

As seen in FIGS. 9 and 10, the engagement state includes a first engagement state (FIG. 9) and a second engagement state (FIG. 10). As seen in FIG. 9, three pawls 64A of the plurality of first engagement pawls 64 engages with three pawls of the plurality of second engagement pawls 68 in the first engagement state. Another three pawls 64B of the plurality of first engagement pawls 64 are free of an engagement with another 18 pawls of the plurality of second engagement pawls 68 in the first engagement state. As seen in FIG. 10, three pawls 64B of the plurality of first engagement pawls 64 engages with three pawls of the plurality of second engagement pawls 68 in the second engagement state. Another three pawls 64A of the plurality of first engagement pawls 64 are free of an engagement with another 18 pawls of the plurality of second engagement pawls 68 in the second engagement state. However, all the first engagement pawls 64 can be configured to engage with the plurality of second engagement pawls 68 in the engagement state. The first engagement pawls 64A and the first engagement pawls 64B are alternately arranged in the circumferential direction D2.

Figure 11:
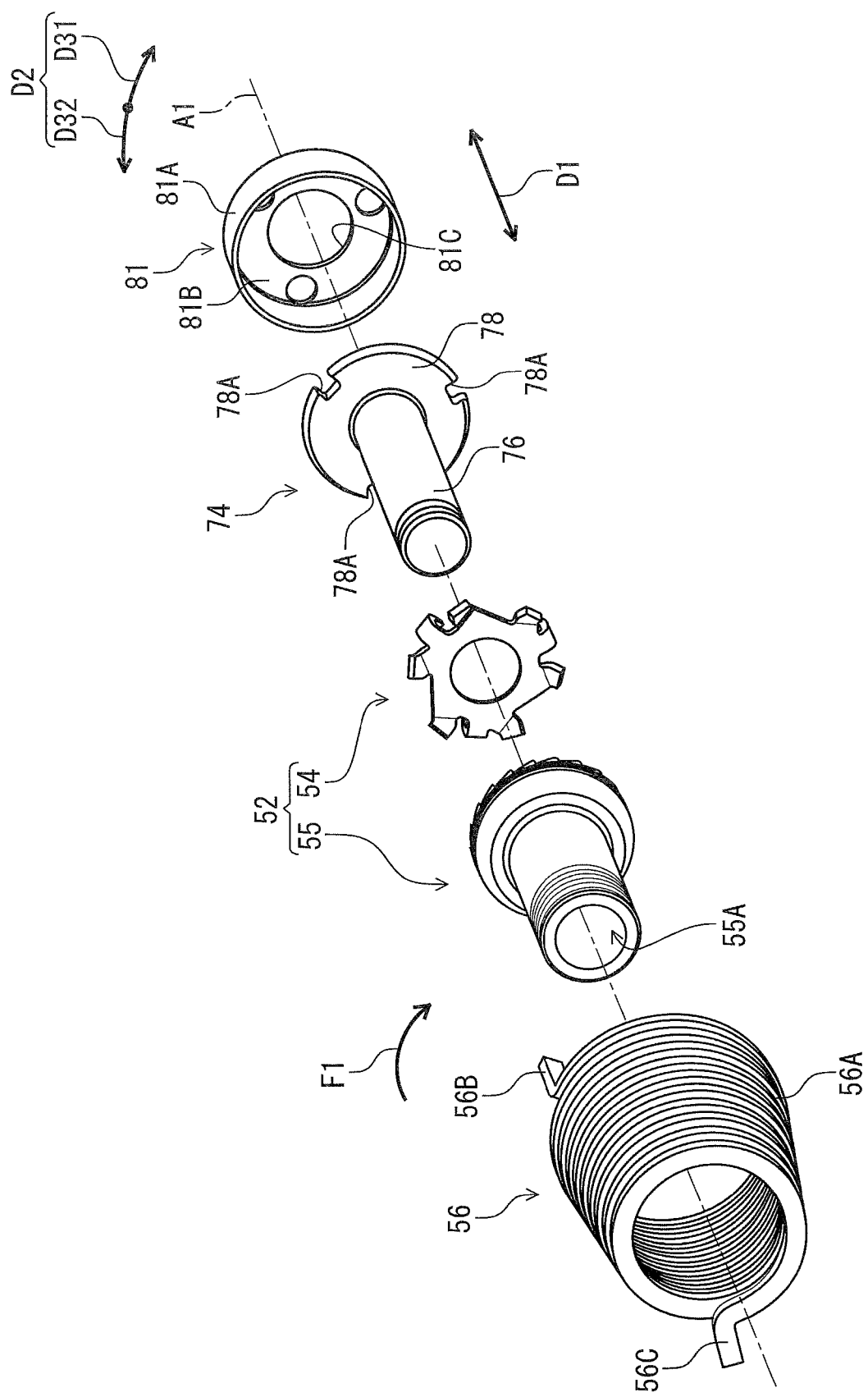
FIG. 11 is an partial exploded perspective view of the rotational one-way clutch of the resistance applying structure illustrated in FIG. 2.

As seen in FIG. 11, the resistance applying structure 50 includes a pivot shaft 74. The pivot shaft 74 extends through the through-hole 55A of the second engagement member 55. The pivot shaft 74 rotatably supports the second engagement member 55 relative to the first engagement member 54. The first engagement member 54 is attached to the pivot shaft 74 to rotate relative to the second engagement member 55 along with the pivot shaft 74 about the pivot axis A1.

The pivot shaft 74 includes a shaft body 76 and a flange 78. The shaft body 76 rotatably supports the second engagement member 55 about the pivot axis A1. The flange 78 is provided at an end of the shaft body 76. The flange 78 includes a plurality of attachment grooves 78A. The plurality of attachment grooves 78A is arranged at regular pitches in the circumferential direction D2 with respect to the pivot axis A1.

As seen in FIG. 5, the first engagement member 54 includes a plurality of attachment pawls 80. The attachment pawl 80 extends radially outwardly from the first outer periphery 66A of the first base body 66. The plurality of attachment pawls 80 is spaced apart from each other in the circumferential direction D2 with respect to the pivot axis A1. In this embodiment, the plurality of attachment pawls 80 is equally spaced apart from each other in the circumferential direction D2 with respect to the pivot axis A1. However, the arrangement of the attachment pawls 80 is not limited to this embodiment.

As seen in FIG. 7, the attachment pawl 80 extends from the first outer periphery 66A of the first base body 66 toward an opposite side of the second engagement member 55 in the axial direction D1. The first engagement member 54 includes a first additional axially facing surface 54B. The attachment pawl 80 protrudes from the first base body 66 beyond the first additional axially facing surface 54B toward the opposite side of the second engagement member 55 in the axial direction D1.

In this embodiment, the at least one attachment pawl 80 is integrally provided with the first base body 66 as a one-piece unitary member. The first engagement member 54 is made of a metallic material. However, the first engagement member 54 can be made of a non-metallic material such as resin. The attachment pawl 80 can be a separate member from the first base body 66 and coupled to the first base body 66 with a joining structure such as welding or adhesive.

Figure 12:
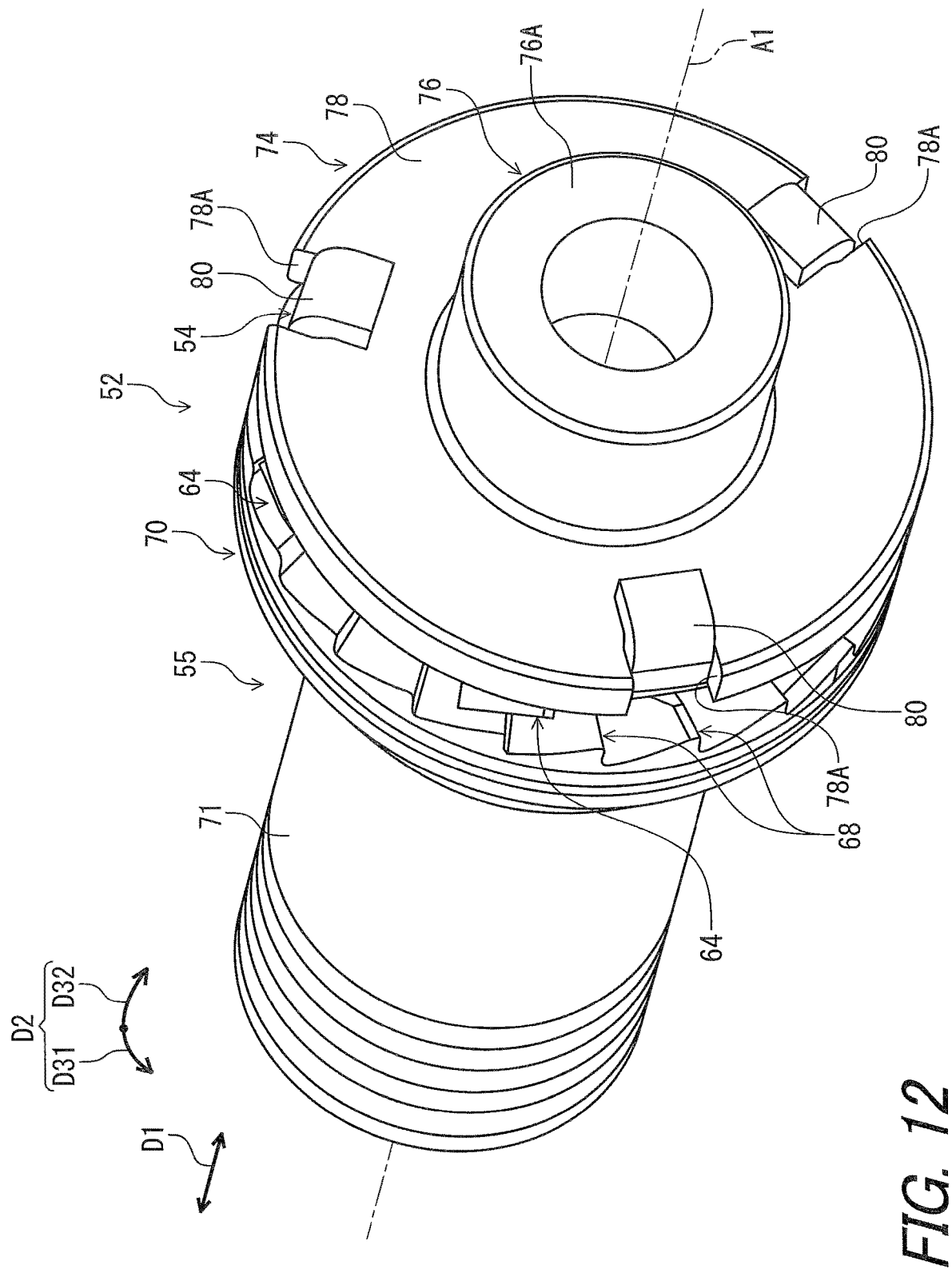
FIG. 12 is a perspective view of the rotational one-way clutch of the resistance applying structure illustrated in FIG. 2, with a pivot shaft.

As seen in FIG. 12, the attachment pawl 80 is provided in the attachment groove 78A. The plurality of attachment pawls 80 is hooked to the flange 78 of the pivot shaft 74. Thus, the first engagement member 54 is rotatable along with the pivot shaft 74 relative to the second engagement member 55 about the pivot axis A1.

As seen in FIG. 11, the resistance applying structure 50 includes a cover 81. The cover 81 is attached to the second engagement member 55 to cover the first engagement member 54 and the flange 78 of the pivot shaft 74. The cover 81 includes a tubular part 81A and an annular part 81B. The annular part 81B includes a cover opening 81C.

Figure 13:
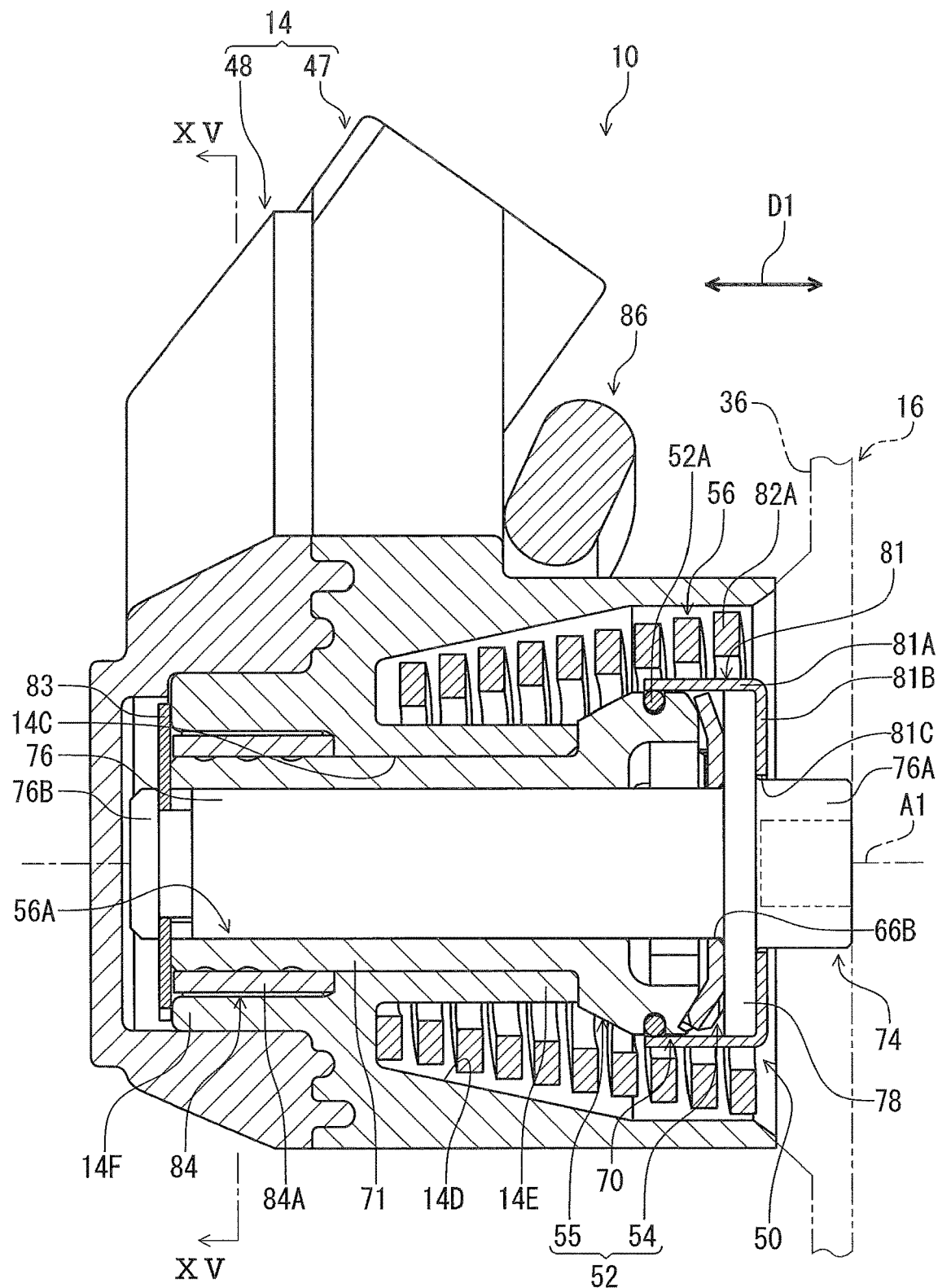
FIG. 13 is a cross-sectional view of the resistance applying structure taken along line XIII-XIII of FIG. 2.

As seen in FIG. 13, the shaft body 76 includes a first shaft end 76A and a second shaft end 76B. The first shaft end 76A extends through the cover opening 81C. The first shaft end 76A is coupled to the first guide plate 36 of the chain guide 16 with a fastener. Thus, the pivot shaft 74, the cover 81, the first engagement member 54 are rotatable relative to the movable member 14 and the second engagement member 55 along with the chain guide 16 about the pivot axis A1. The first engagement member 54, the second engagement member 55, and the flange 78 are at least partly provided radially inward of the tubular part 81A of the cover 81. The rotational one-way clutch 52 includes a seal ring 52A. The seal ring 52A is provided between the cover 81 and the second engagement member 55.

As seen in FIG. 11, the rotational biasing member 56 includes a coiled body 56A, a first end 56B, and a second end 56C. The coiled body 56A generates the rotational biasing force F1. The first end 56B is coupled to the chain guide 16 (FIG. 1). The second end 56C is coupled to the movable member 14 (FIG. 2).

As seen in FIG. 13, the first engagement member 54, the second engagement member 55, the pivot shaft 74, and the cover 81 are provided in the coiled body 56A of the rotational biasing member 56. The movable member 14 includes a support hole 14C. The support tube 71 and the pivot shaft 74 extend through the support hole 14C. The movable member 14 includes a recess 14D. The rotational biasing member 56 is provided in the recess 14D.

The movable member 14 includes a first restriction part 14E. The first restriction part 14E has a tubular shape and includes the support hole 14C. The first restriction part 14E is provided on an opposite side of the first engagement member 54 relative to the second base body 70 of the second engagement member 55. The first restriction part 14E is contactable with the second base body 70 of the second engagement member 55. The resistance applying structure 50 includes a restriction member 83. The restriction member 83 is attached to the second shaft end 76B of the shaft body 76. The movable member 14 includes a second restriction part 14F. The restriction member 83 is contactable with the second restriction part 14F. The first restriction part 14E and the second restriction part 14F are provided between the second base body 70 and the restriction member 83.

As seen in FIG. 2, the resistance applying structure 50 includes a resistance applying member 84 configured to apply rotational resistance to the second engagement member 55. In this embodiment, the resistance applying member 84 is configured to apply the rotational resistance to the support tube 71 of the second engagement member 55.

Figure 14:
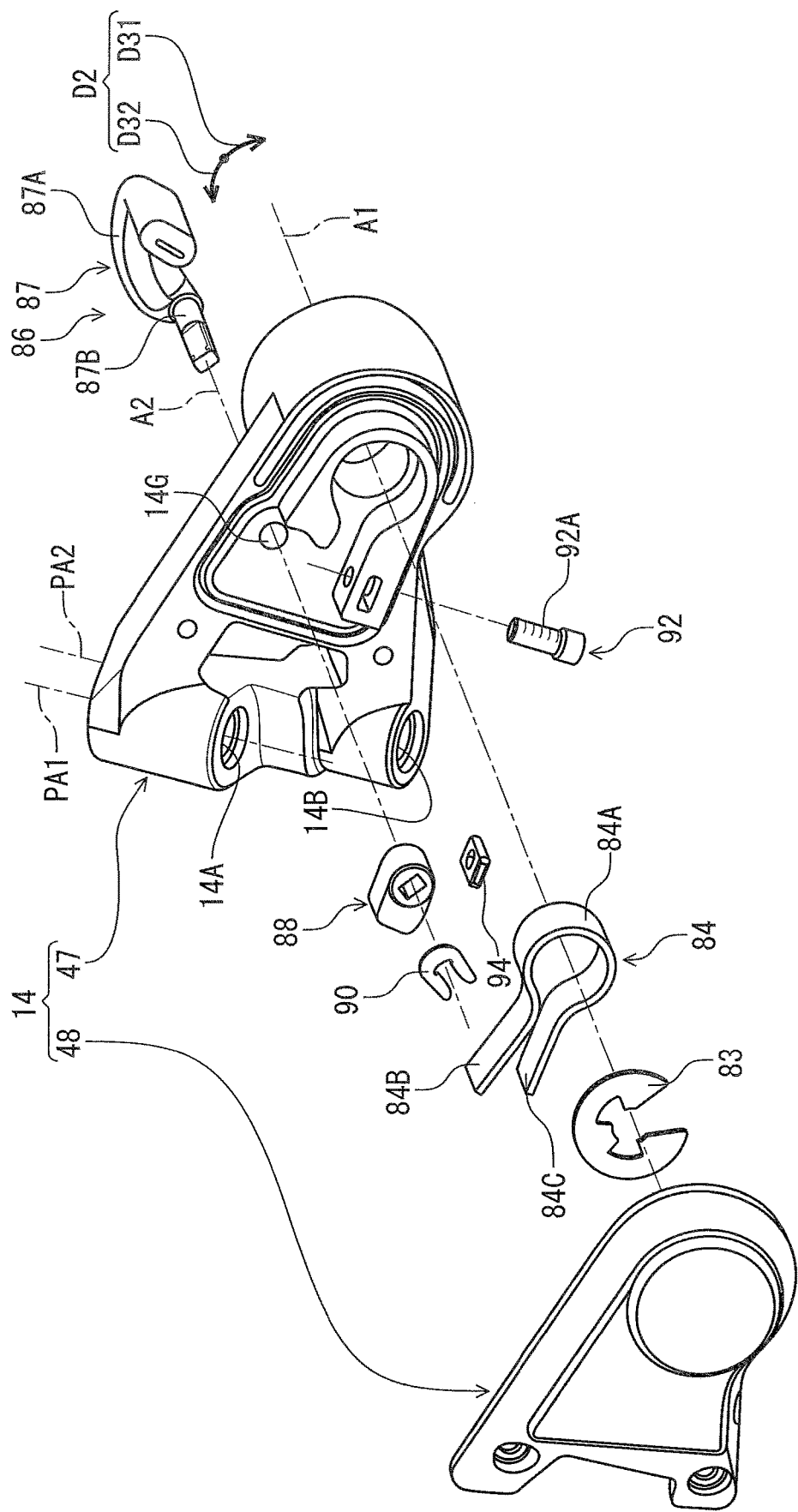
FIG. 14 is another partial exploded perspective view of the rotational one-way clutch of the resistance applying structure illustrated in FIG. 2.

As seen in FIG. 14, the resistance applying member 84 includes a friction spring. For example, the resistance applying member 84 includes a contact part 84A, a first arm 84B, and a second arm 84C. The contact part 84A, the first arm 84B, and the second arm 84C constitute the friction spring. The contact part 84A has a curved shape. The first arm 84B extends from the contact part 84A. The second atm 84C extends from the contact part 84A. The resistance applying member 84 is elastically deformable in response to an external force applied to at least one of the first arm 84B and the second arm 84C.

Figure 15:
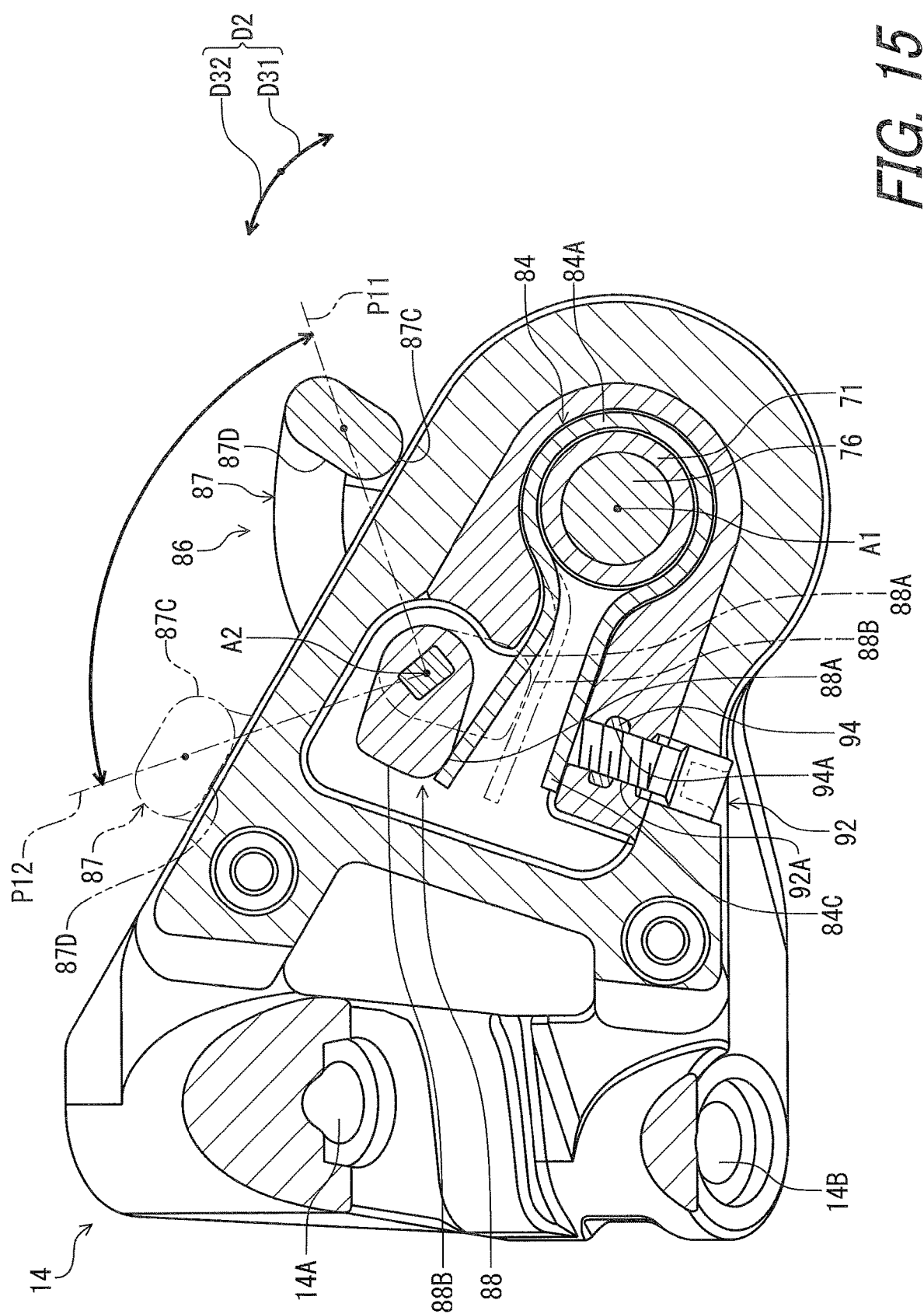
FIG. 15 is a cross-sectional view of the resistance applying structure taken along line XV-XV of FIG. 13.

As seen in FIG. 15, the contact part 84A is in slidable contact with an outer peripheral surface of the support tube 71 of the second engagement member 55. The contact part 84A extends along the outer peripheral surface of the support tube 71 and covers more than a half of the outer peripheral surface of the support tube 71 as viewed along the pivot axis A1. The rotational resistance applied from the resistance applying member 84 to the second engagement member 55 increases when the first arm 84B and the second arm 84C approach each other. The rotational resistance applied from the resistance applying member 84 to the second engagement member 55 decreases when the first arm 84B and the second arm 84C move away from each other.

As seen in FIG. 14, the resistance applying structure 50 includes a resistance control member 86. The resistance control member 86 is configured to be operatively coupled to the resistance applying member 84 so as to change the rotational resistance applied from the resistance applying member 84. The resistance control member 86 is pivotally coupled to the movable member 14 about an additional pivot axis A2. The movable member 14 includes a lever support hole 14G. The resistance control member 86 includes a control lever 87, a control cam 88, and a stopper 90. The control lever 87 extends through the lever support hole 14G. The control cam 88 is attached to the control lever 87 to pivot along with the control lever 87 relative to the movable member 14 about the additional pivot axis A2.

In this embodiment, the additional pivot axis A2 is offset from the pivot axis A1 and extends along the pivot axis A1. The additional pivot axis A2 is non-perpendicular to but parallel to the pivot axis A1. However, the additional pivot axis A2 can be non-parallel to the pivot axis A1.

The control lever 87 includes a lever body 87A and a lever shaft 87B. The lever shaft 87B extends from the lever body 87A along the additional pivot axis A2. The lever shaft 87B extends through the lever support hole 14G. The control cam 88 is attached to the lever shaft 87B. The stopper 90 is attached to the lever shaft 87B to restrict the control cam 88 from being unintentionally removed from the lever shaft 87B.

As seen in FIG. 15, the resistance control member 86 is pivotable relative to the movable member 14 between the first position P11 and the second position P12 about the additional pivot axis A2. The resistance applying member 84 is configured to apply first rotational resistance to the second engagement member 55 in a first state where the resistance control member 86 is in the first position P11. The resistance applying member 84 is configured to apply second rotational resistance to the second engagement member 55 in a second state where the resistance control member 86 is in the second position P12 different from the first position P11. The second rotational resistance is different from the first rotational resistance. In this embodiment, the second rotational resistance is larger than the first rotational resistance.

The resistance control member 86 is configured to gradually change the rotational resistance applied by the resistance applying member 84 as a position of the resistance control member 86 varies. The resistance control member 86 is configured to gradually increase the rotational resistance applied by the resistance applying member 84 while the resistance control member 86 moves from the first position P11 to the second position P12. The resistance control member 86 is configured to gradually decrease the rotational resistance applied by the resistance applying member 84 while the resistance control member 86 moves from the second position P12 to the first position P11. However, the resistance control member 86 is configured to change the rotational resistance applied by the resistance applying member 84 in a stepwise fashion as the position of the resistance control member 86 varies.

The movable member 14 is configured to position the resistance control member 86 in each of the first position P11 and the second position P12. The control lever 87 includes a first contact surface 87C and a second contact surface 87D. The first contact surface 87C is in contact with the movable member 14 in the first state where the resistance control member 86 is in the first position P11. The second contact surface 87D is in contact with the movable member 14 in the second state where the resistance control member 86 is in the second position P12.

The control cam 88 is contactable with the first arm 84B of the resistance applying member 84 in each of the first state and the second state of the resistance control member 86. The control cam 88 includes a first cam surface 88A and a second cam surface 88B. The first cam surface 88A of the control cam 88 is in contact with the first arm 84B of the resistance applying member 84 in the first state where the resistance control member 86 is in the first position P11. The second cam surface 88B of the control cam 88 is in contact with the first arm 84B of the resistance applying member 84 in the second state where the resistance control member 86 is in the second position P12.

The resistance control member 86 can include other structures such as a bolt and a nut. The resistance applying structure 50 can include an electric actuator instead of or in addition to the resistance control member 86. In such an embodiment, the electric actuator is configured to be operatively coupled to the resistance applying member 84 so as to change the rotational resistance applied from the resistance applying member 84. Examples of the electric actuator include a motor and a solenoid.

As seen in FIG. 14, the resistance applying structure 50 includes a resistance adjustment member 92 and a support plate 94. The resistance adjustment member 92 and the support plate 94 are attached to the movable member 14 to change the rotational resistance.

As seen in FIG. 15, the resistance adjustment member 92 includes an external thread 92A. The support plate 94 includes a threaded hole 94A. The external thread 92A of the resistance adjustment member 92 is threadedly engaged with the threaded hole 94A of the support plate 94. The resistance adjustment member 92 is in contact with the second arm 84C of the resistance applying member 84. Rotation of the resistance adjustment member 92 relative to the movable member 14 changes the position of the second arm 84C of the resistance applying member 84 relative to the first arm 84B of the resistance applying member 84. This gradually changes the rotational resistance applied to the second engagement member 55.

As seen in FIG. 2, the rotational one-way clutch 52 allows the first engagement member 54 to rotate relative to the second engagement member 55 in the first rotational direction D31 about the pivot axis A1 not to transmit the rotational resistance from the second engagement member 55 to the chain guide 16 (FIG. 1). The rotational one-way clutch 52 restricts the first engagement member 54 from rotating relative to the second engagement member 55 in the second rotational direction D32 about the pivot axis A1 to transmit the rotational resistance from the second engagement member 55 to the chain guide 16 (FIG. 1).

Figure 16:
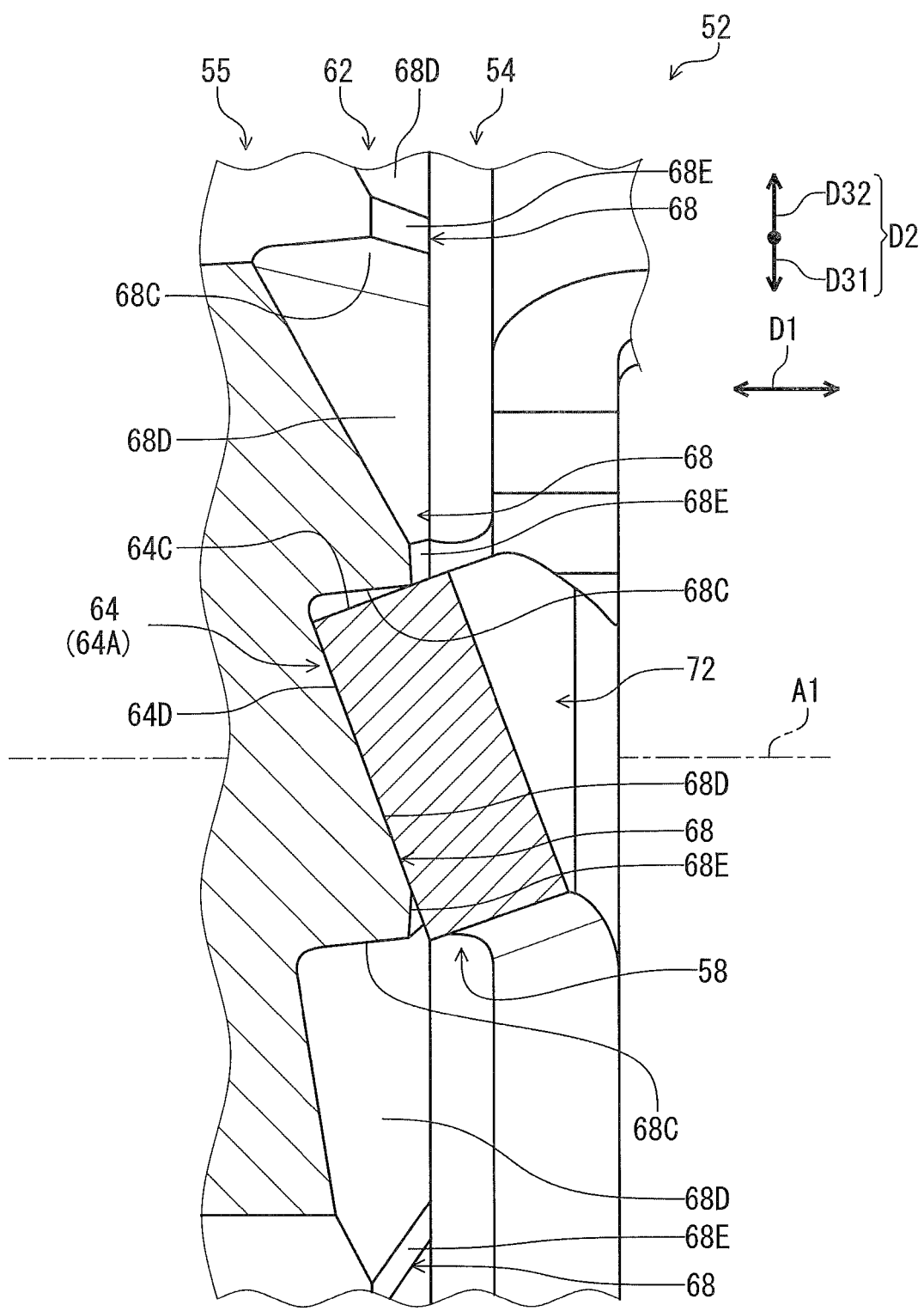
FIG. 16 is a cross-sectional view of the rotational one-way clutch taken along line XVI-XVI of FIG. 9.
Figure 17:
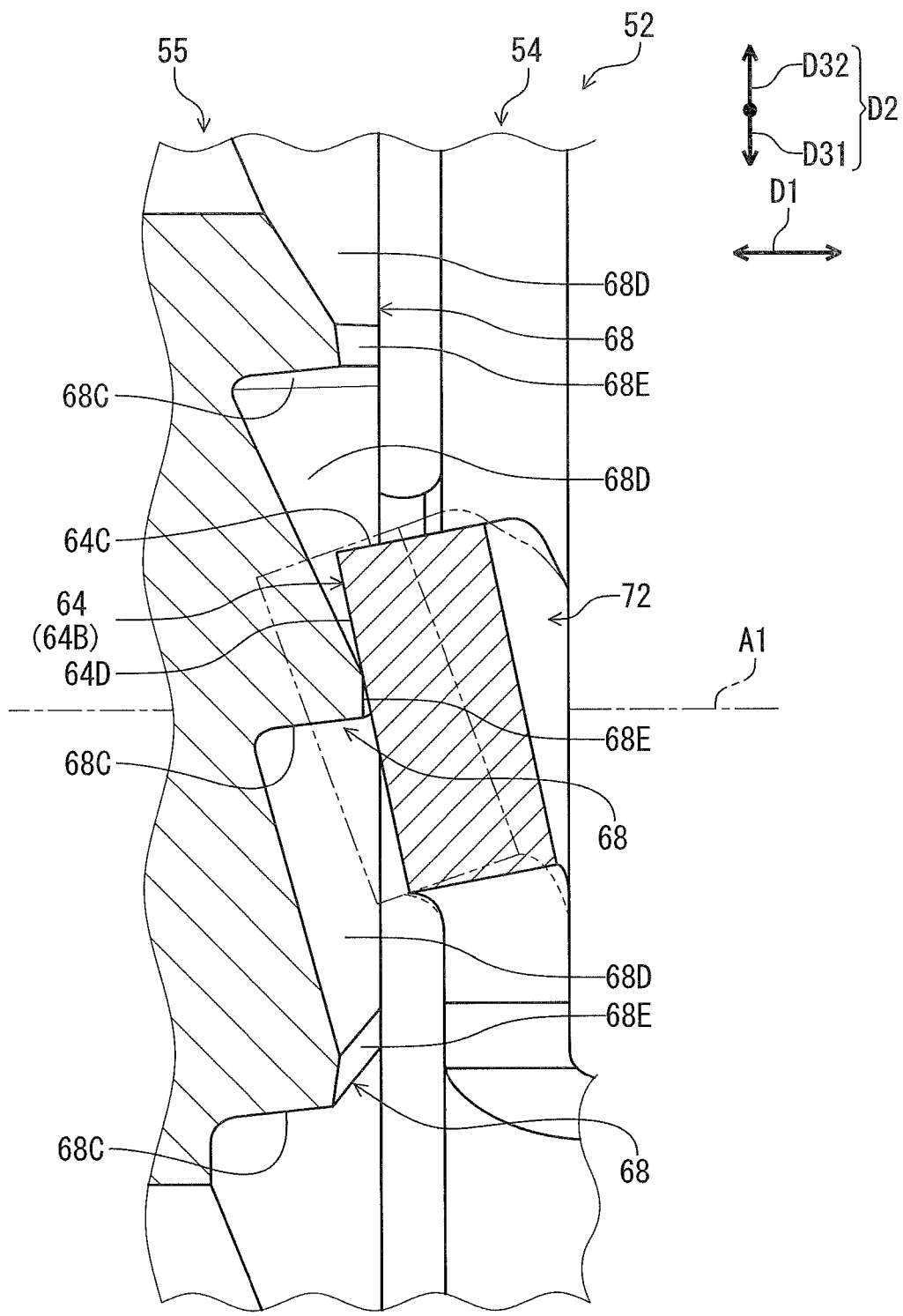
FIG. 17 is a cross-sectional view of the rotational one-way clutch taken along line XVII-XVII of FIG. 9.

As seen in FIGS. 16 and 17, the at least one first engagement pawl 64 is elastically deformed by the at least one second engagement pawl 68 while the chain guide 16 (FIG. 1) rotates relative to the movable member 14 in the first rotational direction D31 (FIGS. 1 and 9) about the pivot axis A1. The at least one first engagement pawl 64 is elastically deformed by a first deformation amount DA1 in the axial direction D1 while the chain guide 16 (FIG. 1) rotates relative to the movable member 14 in the first rotational direction D31 (FIGS. 1 and 9) about the pivot axis A1. The at least one first engagement pawl 64 is elastically deformed by a second deformation amount DA2 in the axial direction D1 while the chain guide 16 (FIG. 1) rotates relative to the movable member 14 in the second rotational direction D32 (FIGS. 1 and 9) about the pivot axis A1. In this embodiment, the first deformation amount DA1 is larger than the second deformation amount DA2. The second deformation amount DA2 can be 0 mm. However, the first deformation amount DA1 and the second deformation amount DA2 are not limited to this embodiment and the above ranges.

As seen in FIGS. 16 and 17, the elastic portion 72 provided to the first engagement pawl 64 is elastically deformed in the axial direction D1 by the second engagement pawl 68 while the first engagement member 54 and the chain guide 16 (FIG. 1) rotates relative to the movable member 14 in the first rotational direction D31 (FIGS. 1 and 9) about the pivot axis A1. Thus, the rotational one-way clutch 52 does not transmit the rotational resistance from the second engagement member 55 to the chain guide 16 (FIG. 1) when the chain guide 16 rotates relative to the movable member 14 in the first rotational direction D31 about the pivot axis A1.

As seen in FIG. 16, the first engagement pawl 64 includes a first circumferential surface 64C and a first axial surface 64D. The first circumferential surface 64C faces in the circumferential direction D2 (the second rotational direction D32). The first axial surface 64D faces in the axial direction D1 and is inclined relative to the axial direction D1 and the circumferential direction D2.

The second engagement pawl 68 includes a second circumferential surface 68C, a second axial surface 68D, and a pawl tip 68E. The second circumferential surface 68C faces in the circumferential direction D2 (the first rotational direction D31). The second axial surface 68D faces in the axial direction D1. The pawl tip 68E faces in the axial direction D1 and is inclined relative to the axial direction D1 and the circumferential direction D2. The pawl tip 68E is provided between the second circumferential surface 68C and the second axial surface 68D in the circumferential direction D2.

The first circumferential surface 64C of the first engagement pawl 64A is in contact with at least one of the second circumferential surface 68C and the pawl tip 68E in the first engagement state. The first axial surface 64D of the first engagement pawl 64A is in contact with at least one of the second axial surface 68D and the pawl tip 68E in the first engagement state.

As seen in FIG. 17, the first circumferential surface 64C of the first engagement pawl 64B is spaced apart from the second circumferential surface 68C in the first engagement state. The first axial surface 64D of the first engagement pawl 64B is in contact with at least one of the second axial surface 68D and the pawl tip 68E in the first engagement state.

Figure 18:
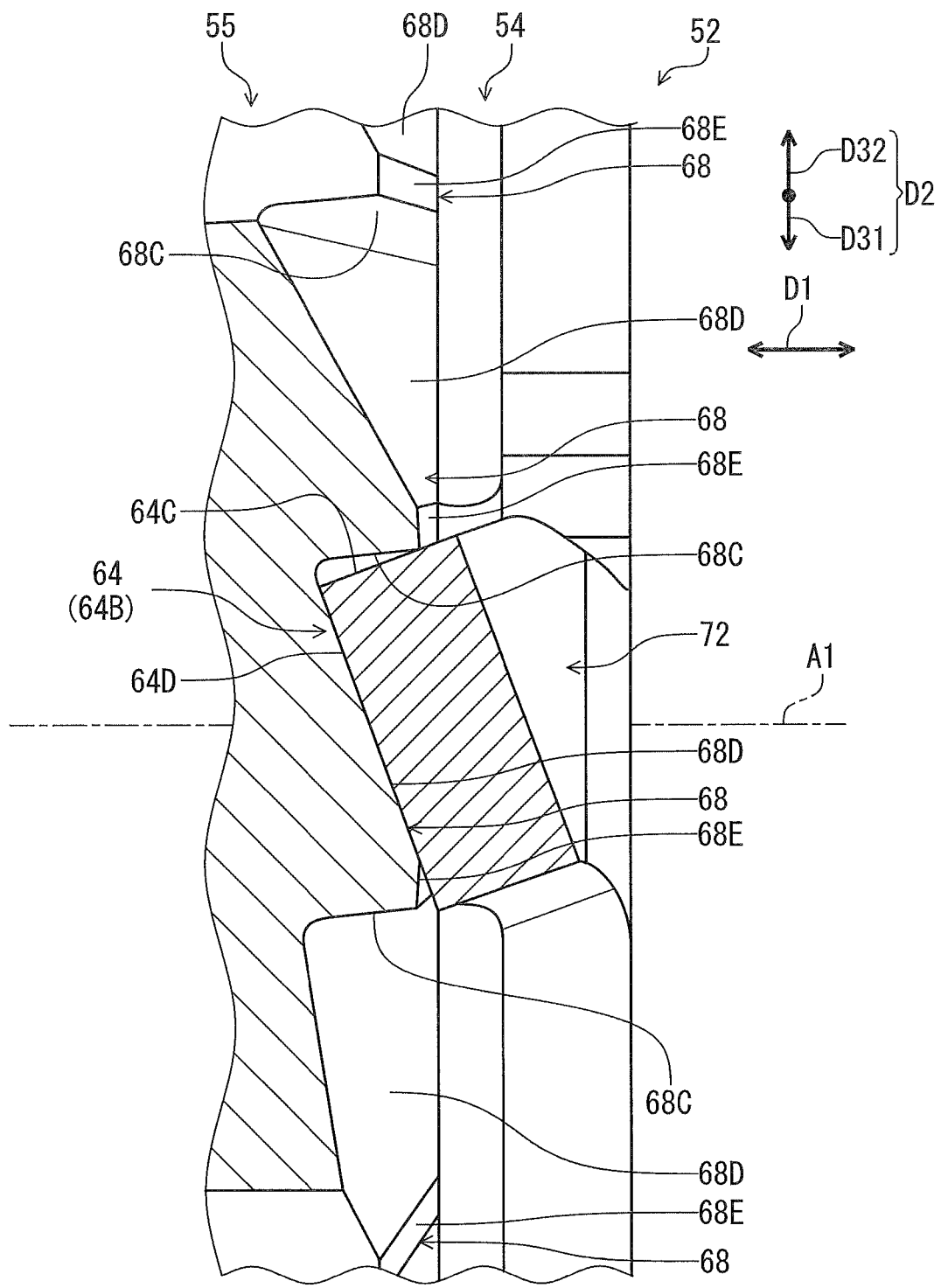
FIG. 18 is a cross-sectional view of the rotational one-way clutch taken along line XVIII-XVIII of FIG. 10.

As seen in FIG. 18, the first circumferential surface 64C of the first engagement pawl 64B is in contact with at least one of the second circumferential surface 68C and the pawl tip 68E in the second engagement state. The first axial surface 64D of the first engagement pawl 64B is in contact with at least one of the second axial surface 68D and the pawl tip 68E in the second engagement state.

Figure 19:
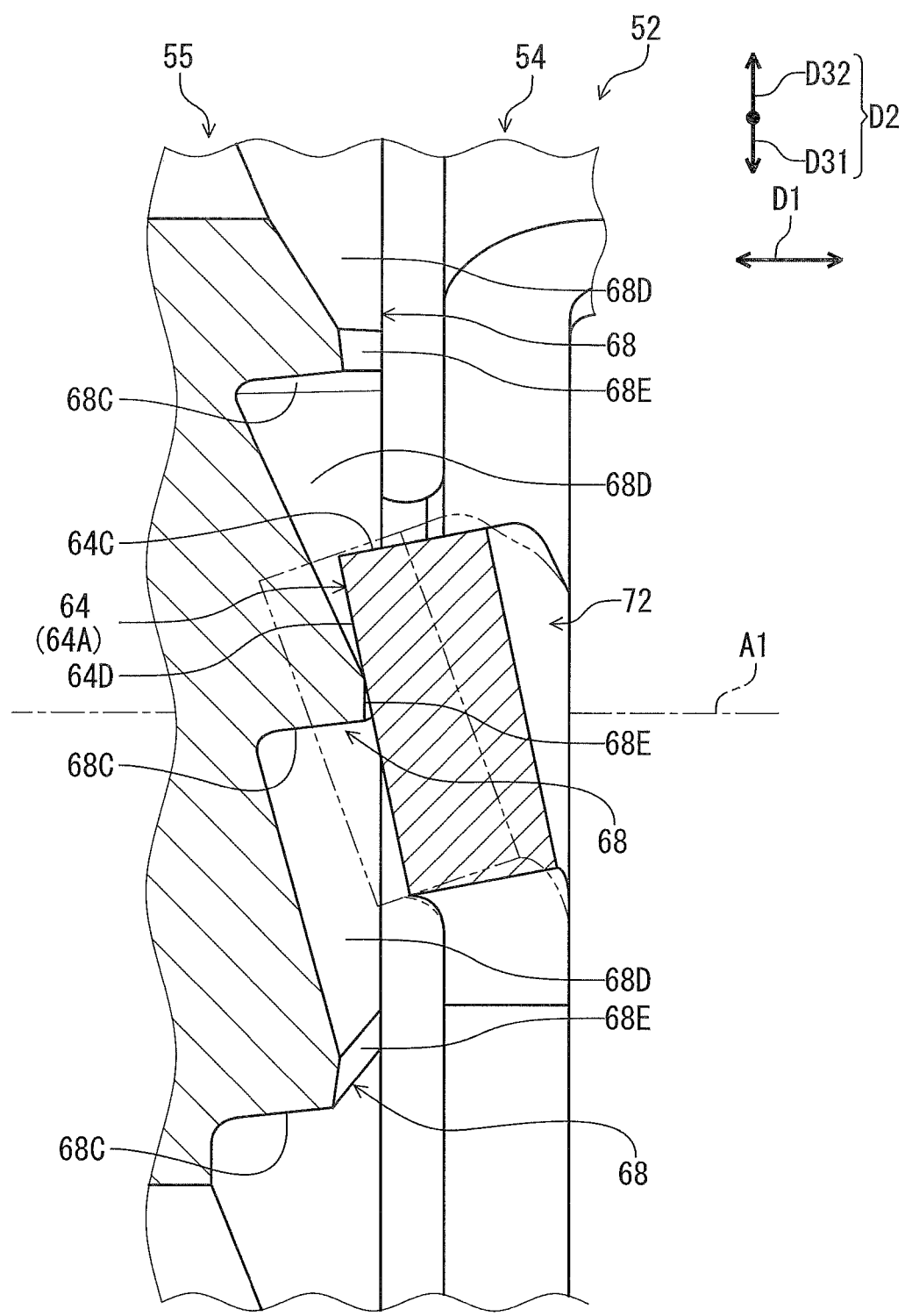
FIG. 19 is a cross-sectional view of the rotational one-way clutch taken along line XIX-XIX of FIG. 10.

As seen in FIG. 19, the first circumferential surface 64C of the first engagement pawl 64A is spaced apart from the second circumferential surface 68C in the second engagement state. The first axial surface 64D of the first engagement pawl 64A is in contact with at least one of the second axial surface 68D and the pawl tip 68E in the second engagement state.

Figure 20:
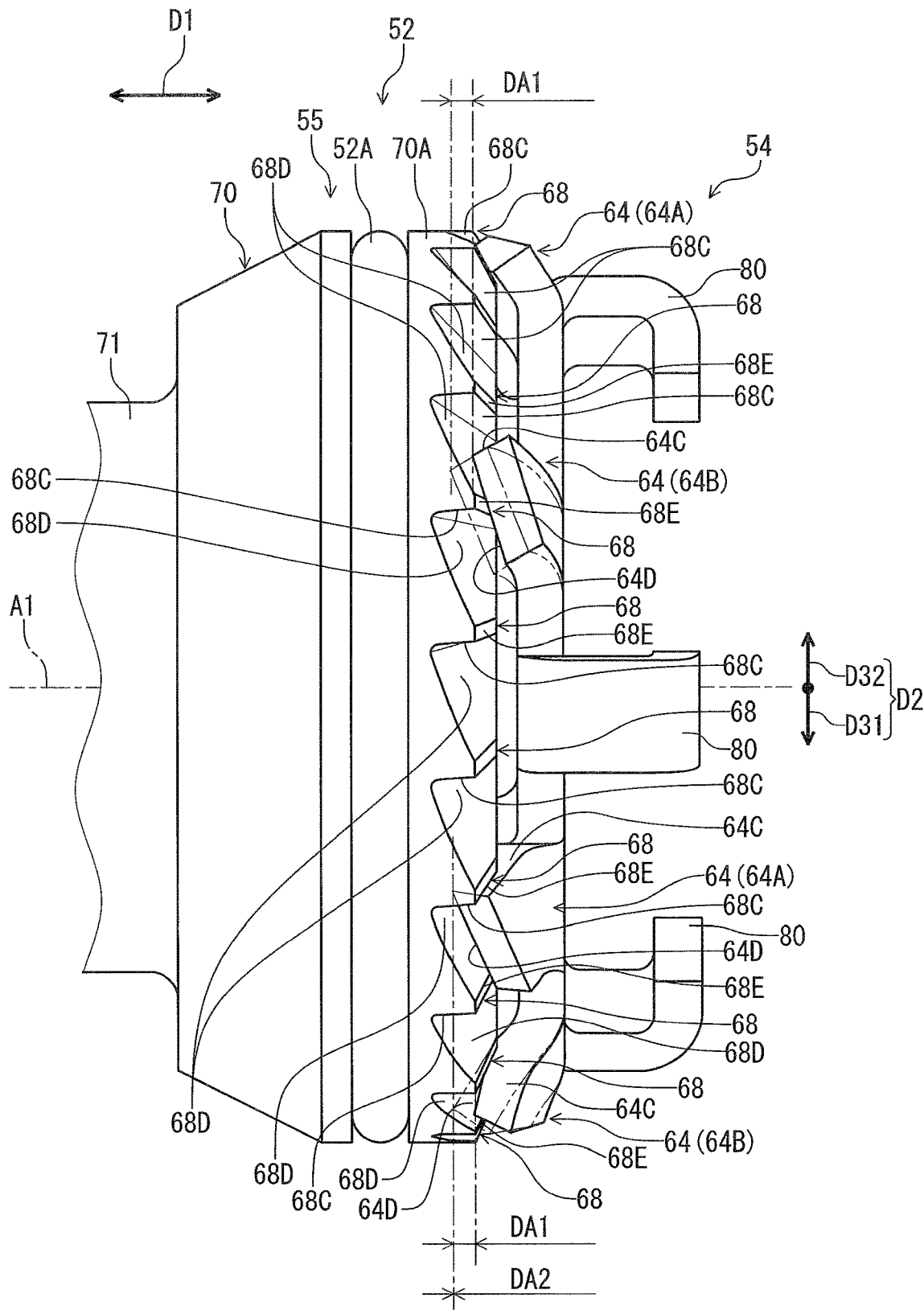
FIG. 20 is a partial front view of the rotational one-way clutch of the resistance applying structure illustrated in FIG. 2 (first engagement state).
Figure 21:
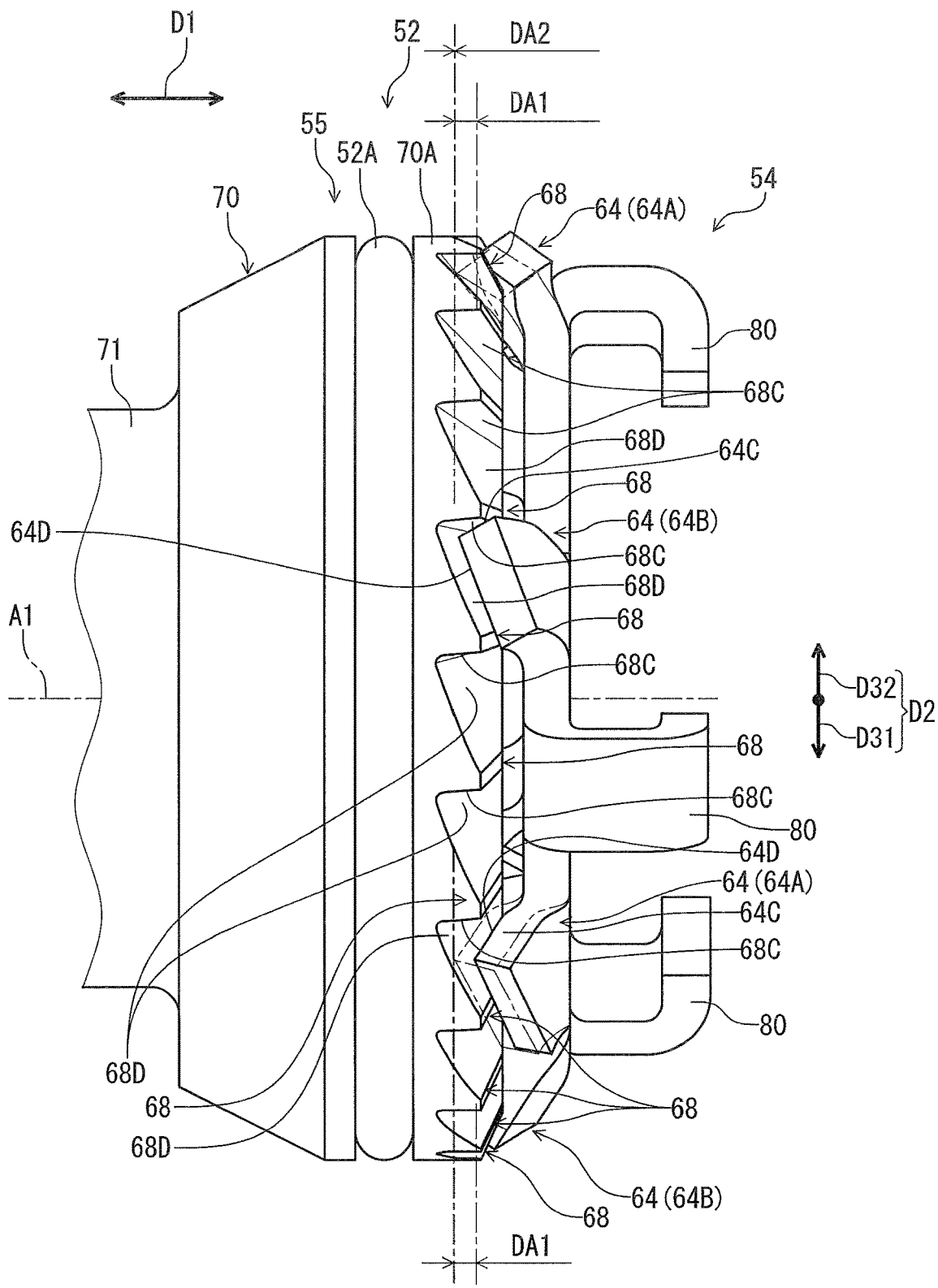
FIG. 21 is a partial front view of the rotational one-way clutch of the resistance applying structure illustrated in FIG. 2 (second engagement state).
Figure 22:
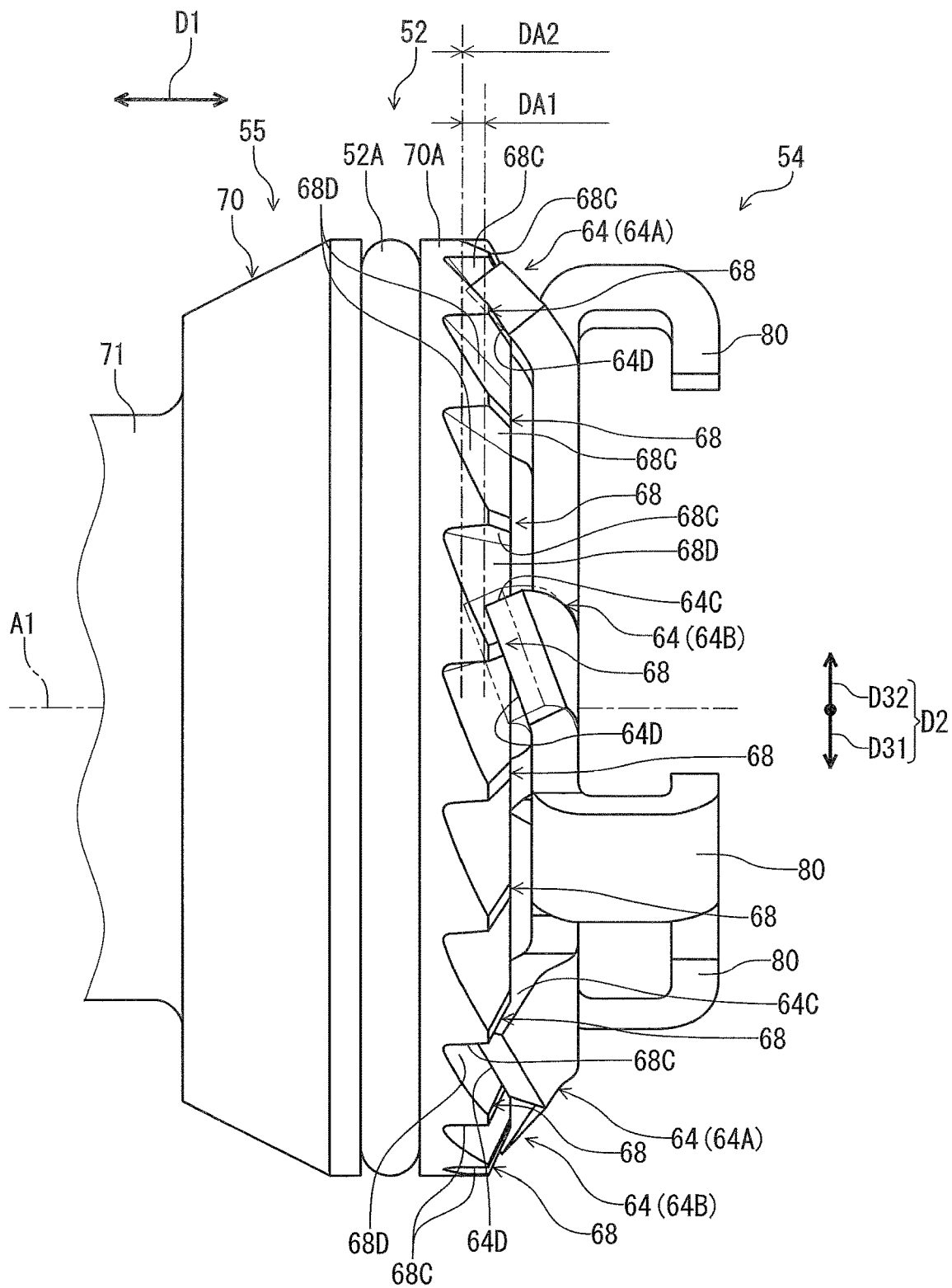
FIG. 22 is another partial front view of the rotational one-way clutch of the resistance applying structure illustrated in FIG. 2 (first engagement state).

As seen in FIGS. 20 to 22, the first engagement pawl 64 is guided along the second axial surface 68D of the second engagement pawl 68 to be elastically deformed in the axial direction D1 when the first engagement member 54 rotates relative to the movable member 14 in the first rotational direction D31. Thus, the first engagement member 54 is rotatable relative to the second engagement member 55 in the first rotational direction D31.

The first engagement pawl 64A meshes with the second circumferential surface 68C of the second engagement pawl 68 when the first engagement member 54 rotates relative to the movable member 14 in the second rotational direction D32. Thus, the rotational one-way clutch 52 restricts the first engagement member 54 from rotating relative to the second engagement member 55 in the second rotational direction D32. The first engagement member 54, the second engagement member 55, and the chain guide 16 (FIG. 1) rotates together relative to the movable member 14 in the second rotational direction D32. Accordingly, the resistance applying structure 50 applies the rotational resistance to the chain guide 16 when the chain guide 16 rotates relative to the movable member 14 in the second rotational direction D32.

Second Embodiment

A bicycle derailleur 210 in accordance with a second embodiment will be described below referring to FIGS. 23 to 29. The bicycle derailleur 210 has the same structure as that of the bicycle derailleur 10 except for the rotational one-way clutch 52. Thus, elements having substantially the same function as those in the first embodiment will be numbered the same here and will not be described and/or illustrated again in detail here for the sake of brevity.

Figure 23:
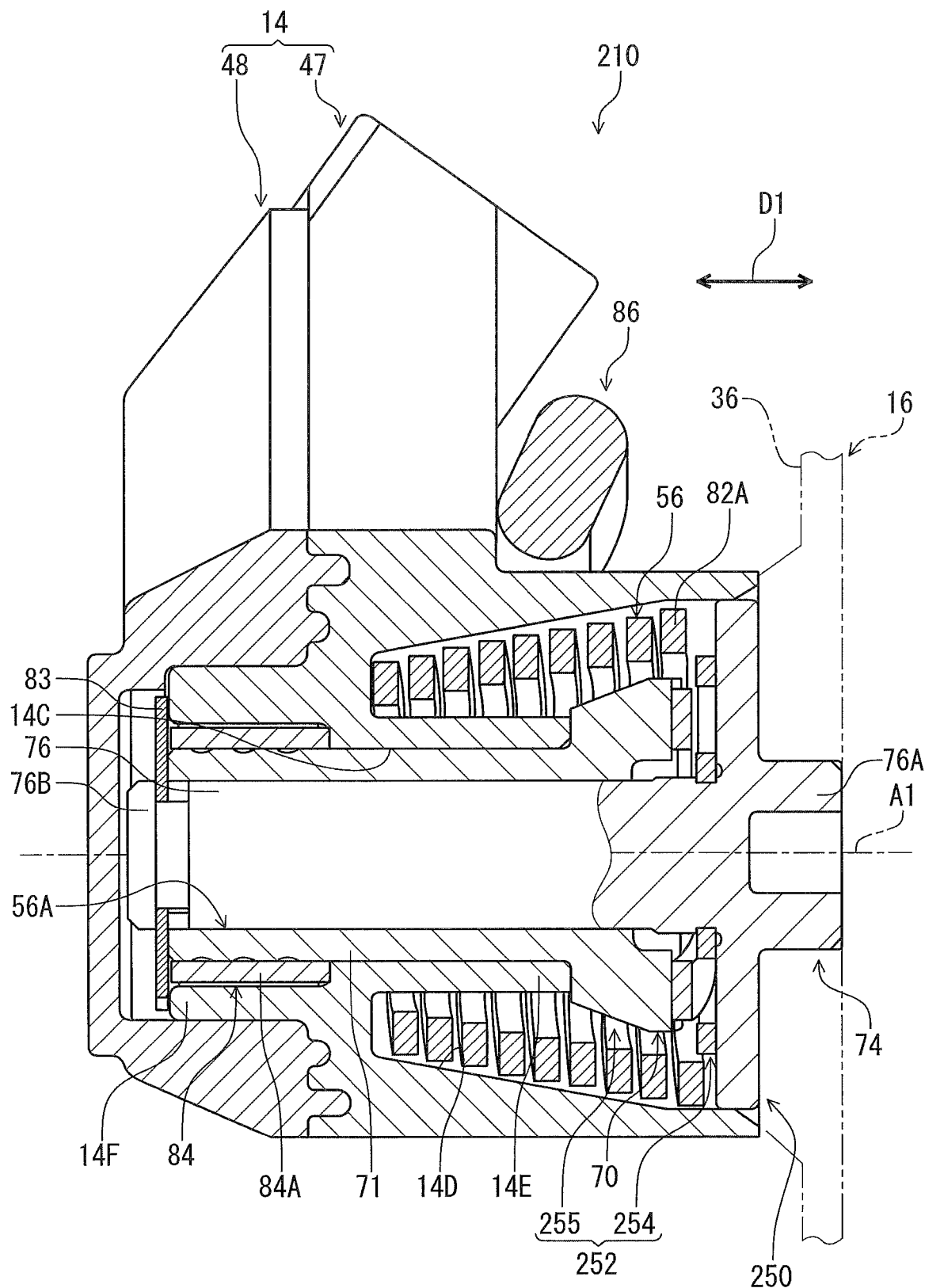
FIG. 23 is a cross-sectional view of a resistance applying structure of a bicycle derailleur in accordance with a second embodiment.

As seen in FIG. 23, the bicycle derailleur 210 comprises a resistance applying structure 250. The resistance applying structure 250 includes a rotational one-way clutch 252. The resistance applying structure 250 has substantially the same structure as that of the resistance applying structure 50 of the first embodiment. The rotational one-way clutch 252 has substantially the same structure as that of the rotational one-way clutch 52 of the first embodiment. The rotational one-way clutch 252 includes a first engagement member 254 and a second engagement member 255. The first engagement member 254 and the second engagement member 255 are configured to be rotatable about the pivot axis A1.

Figure 24:
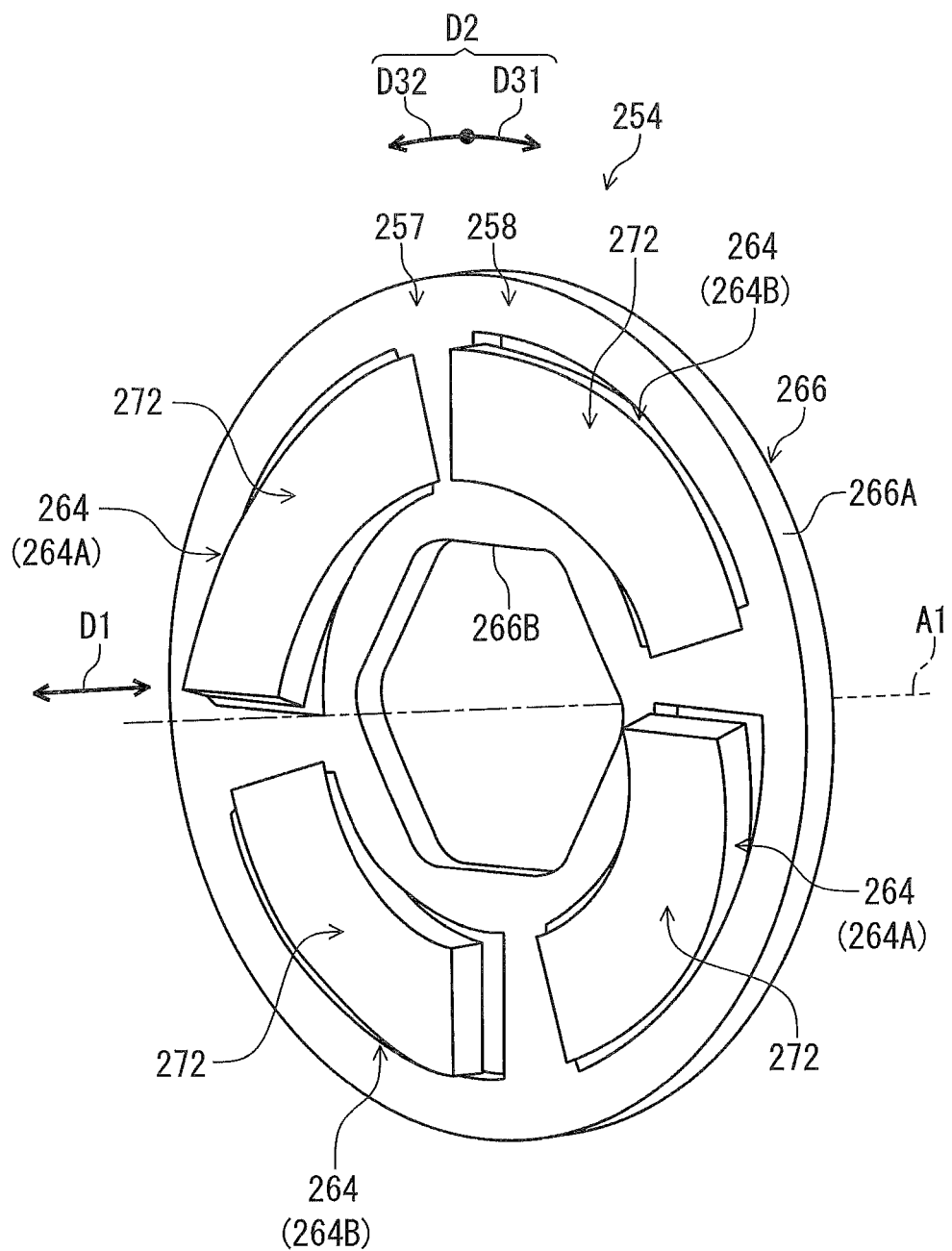
FIG. 24 is a perspective view of a first engagement member of the resistance applying structure of the bicycle derailleur illustrated in FIG. 23.
Figure 25:
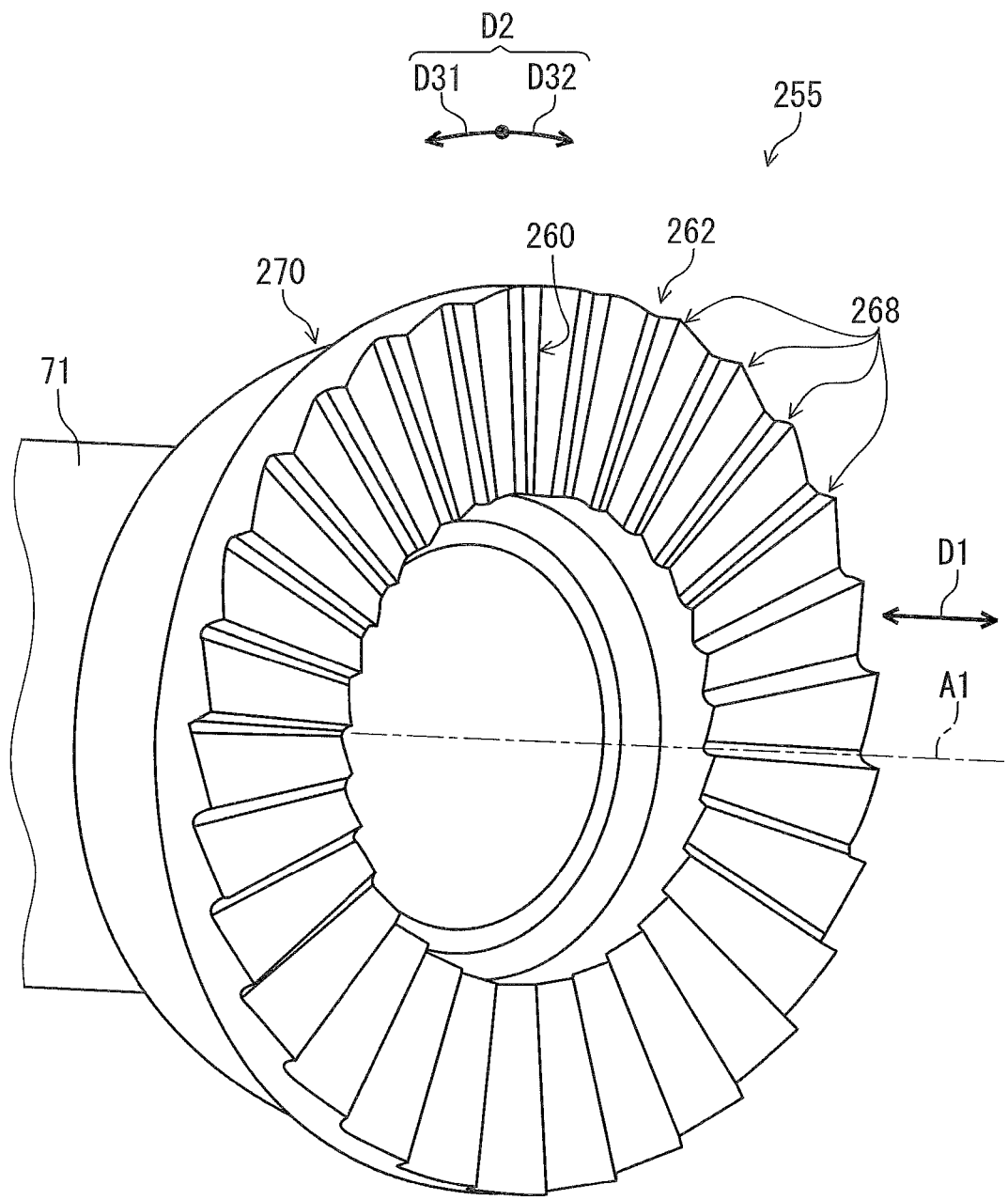
FIG. 25 is a perspective view of a second engagement member of the resistance applying structure of the bicycle derailleur illustrated in FIG. 23.
Figure 26:
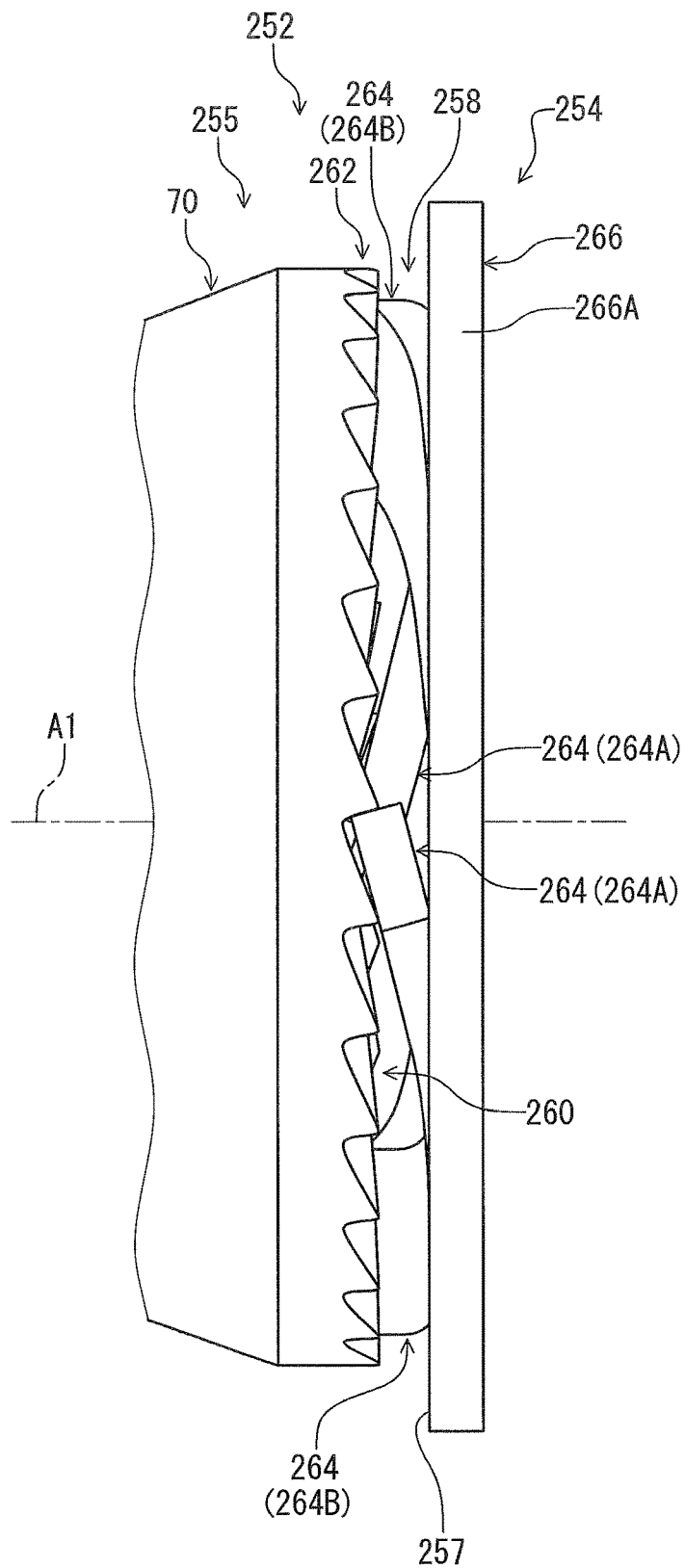
FIG. 26 is a partial front view of a rotational one-way clutch of the resistance applying structure of the bicycle derailleur illustrated in FIG. 23.

As seen in FIG. 24, the first engagement member 254 has a first axially facing surface 257 and a first engagement profile 258 provided to the first axially facing surface 257. As seen in FIG. 25, the second engagement member 255 has a second axially facing surface 260 and a second engagement profile 262 provided to the second axially facing surface 260. As seen in FIG. 26, the first axially facing surface 257 and the second axially facing surface 260 are configured to face each other in the axial direction D1 with respect to the pivot axis A1.

As seen in FIG. 24, the first engagement member 254 has an annular shape. The first engagement profile 258 includes at least one first engagement pawl 264. The at least one first engagement pawl 264 includes a plurality of first engagement pawls 264. Namely, the first engagement profile 258 includes the plurality of first engagement pawls 264. In this embodiment, a total number of the plurality of first engagement pawls 264 is an even number. The total number of the at least one first engagement pawl 264 is equal to or larger than one and is equal to or smaller than eight. The total number of the at least one first engagement pawl 264 is equal to or larger than two. The total number of the at least one first engagement pawl 264 is equal to or smaller than six. In this embodiment, the total number of the at least one first engagement pawls 264 is four. However, the total number of the plurality of first engagement pawls 264 is not limited to this embodiment and the above ranges. The total number of the plurality of first engagement pawls 264 can be an odd number.

The first engagement member 254 includes a first base body 266 including the first axially facing surface 257. The first base body 266 has an annular shape provided about the pivot axis A1. The first base body 266 includes a first outer periphery 266A and an opening 266B. The plurality of first engagement pawls 264 is provided radially between the first outer periphery 266A and the pivot axis A1. The first engagement pawl 264 extends from the first base body 266 in the circumferential direction D2 (the second rotational direction D32).

The plurality of first engagement pawls 264 is spaced apart from each other in the circumferential direction D2 with respect to the pivot axis A1. In this embodiment, the plurality of first engagement pawls 264 is equally spaced apart from each other in the circumferential direction D2 with respect to the pivot axis A1. However, the arrangement of the first engagement pawls 264 is not limited to this embodiment.

As seen in FIG. 26, the at least one first engagement pawl 264 protrudes toward the second engagement member 255 in the axial direction D1. The first engagement pawl 264 protrudes from the first base body 266 beyond the first axially facing surface 257 toward the second engagement member 255 in the axial direction D1.

In this embodiment, the at least one first engagement pawl 264 is a separate member from the first base body 266 and coupled to the first base body 266 with a joining structure such as welding or adhesive. The first engagement member 254 is made of a metallic material. However, the first engagement member 254 can be made of a non-metallic material such as resin. The first engagement pawl 264 can be integrally provided with the first base body 266 as a one-piece unitary member.

As seen in FIG. 25, the second engagement member 255 has an annular shape. The second engagement profile 262 includes at least one second engagement pawl 268 configured to engage with the at least one first engagement pawl 264. The at least one second engagement pawl 268 includes a plurality of second engagement pawls 268. In this embodiment, a total number of the plurality of second engagement pawls 268 is an even number. The total number of the at least one second engagement pawl 268 is equal to or larger than 20 and is equal to or smaller than 40. The total number of the at least one second engagement pawl 268 is equal to or smaller than 36. The total number of the at least one second engagement pawl 268 is equal to or smaller than 34. In this embodiment, the total number of the second engagement pawls 268 is 30. However, the total number of the second engagement pawls 268 is not limited to this embodiment and the above range. The total number of the plurality of second engagement pawls 268 can be an odd number.

In this embodiment, the total number of the plurality of first engagement pawls 264 is smaller than the total number of the plurality of second engagement pawls 268. However, the total number of the plurality of first engagement pawls 264 can be equal to or larger than the total number of the plurality of second engagement pawls 268.

The second engagement member 255 includes a second base body 270 including the second axially facing surface 260. The second base body 270 has an annular shape provided about the pivot axis A1. The second base body 270 includes a second outer periphery 270A. The plurality of second engagement pawls 268 is provided radially between the second outer periphery 270A and the pivot axis A1. However, the second engagement pawl 268 can be provided to extend radially outwardly from the second outer periphery 270A.

The plurality of second engagement pawls 268 is spaced apart from each other in the circumferential direction D2 with respect to the pivot axis A1. In this embodiment, the plurality of second engagement pawls 268 is equally spaced apart from each other in the circumferential direction D2 with respect to the pivot axis A1. The second engagement pawl 268 radially extends from the second axially facing surface 260 to the second outer periphery 270A of the second base body 270. However, the arrangement of the second engagement pawls 268 is not limited to this embodiment.

As seen in FIG. 24, the rotational one-way clutch 252 includes an elastic portion 272. The elastic portion 272 is provided to at least one of the first axially facing surface 257 of the first engagement member 254 and the second axially facing surface 260 of the second engagement member 255. In this embodiment, the elastic portion 272 is provided to the at least one first engagement pawl 264. The elastic portion 272 is provided to the plurality of first engagement pawls 264. The first engagement pawl 264 is elastically deformable in the axial direction D1. The first engagement pawl 264 can be the same as the elastic portion 272. However, the elastic portion 272 can be provided to the second engagement pawl 268 (FIG. 25) or both the first engagement pawl 264 and the second engagement pawl 268 (FIG. 25).

As seen in FIG. 26, the first engagement profile 258 and the second engagement profile 262 are configured to engage with each other in an engagement state of the first engagement member 254 and the second engagement member 255. In the engagement state of the first engagement member 254 and the second engagement member 255, the first engagement member 254 is restricted from rotating relative to the second engagement member 255 in the second rotational direction D32 about the pivot axis A1.

In this embodiment, at least one pawl of the plurality of first engagement pawls 264 engages with the at least one second engagement pawl 268 in the engagement state of the first engagement member 254 and the second engagement member 255. Another pawl of the plurality of first engagement pawls 264 is free of an engagement with the at least one second engagement pawl 268 in the engagement state of the first engagement member 254 and the second engagement member 255.

Specifically, two pawls of the plurality of first engagement pawls 264 engages with two pawls of the plurality of second engagement pawls 268 in the engagement state of the first engagement member 254 and the second engagement member 255. Another two pawls of the plurality of first engagement pawls 264 are free of an engagement with another 28 pawls of the plurality of second engagement pawls 268 in the engagement state of the first engagement member 254 and the second engagement member 255.

The engagement state includes a first engagement state and a second engagement state in the same way as the rotational one-way clutch 52 of the first embodiment. Two pawls 264A of the plurality of first engagement pawls 264 engages with two pawls of the plurality of second engagement pawls 268 in the first engagement state. Another two pawls 264B of the plurality of first engagement pawls 264 are free of an engagement with another 28 pawls of the plurality of second engagement pawls 268 in the first engagement state. Two pawls 264B of the plurality of first engagement pawls 264 engages with two pawls of the plurality of second engagement pawls 268 in the second engagement state. Another two pawls 264A of the plurality of first engagement pawls 264 are free of an engagement with another 28 pawls of the plurality of second engagement pawls 268 in the second engagement state. However, all the first engagement pawls 264 can be configured to engage with the plurality of second engagement pawls 268 in the engagement state. As seen in FIG. 24, the first engagement pawls 264A and the first engagement pawls 264B are alternately arranged in the circumferential direction D2.

Figure 27:
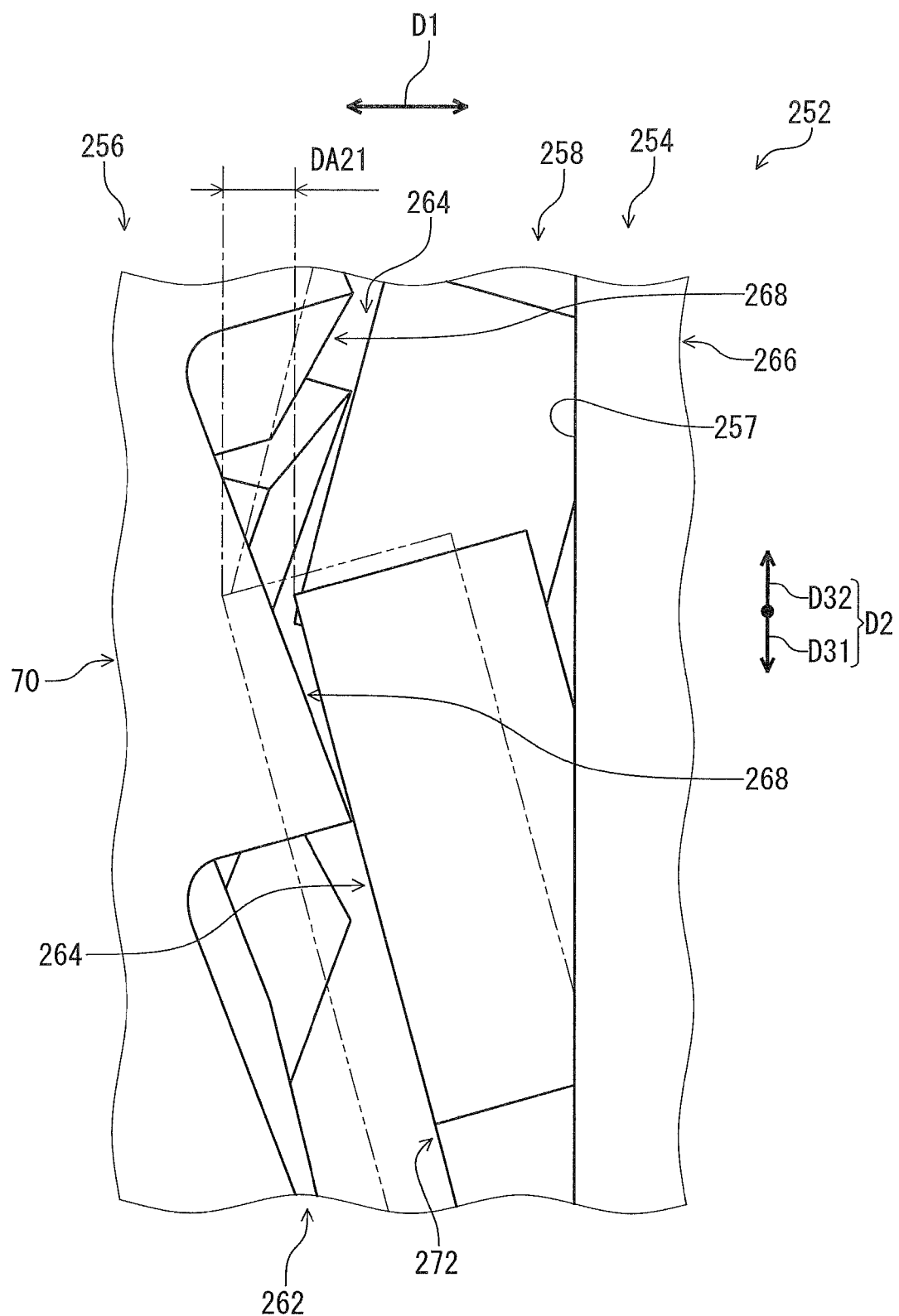
FIG. 27 is a partial enlarged front view of the rotational one-way clutch of the resistance applying structure of the bicycle derailleur illustrated in FIG. 23.
Figure 28:
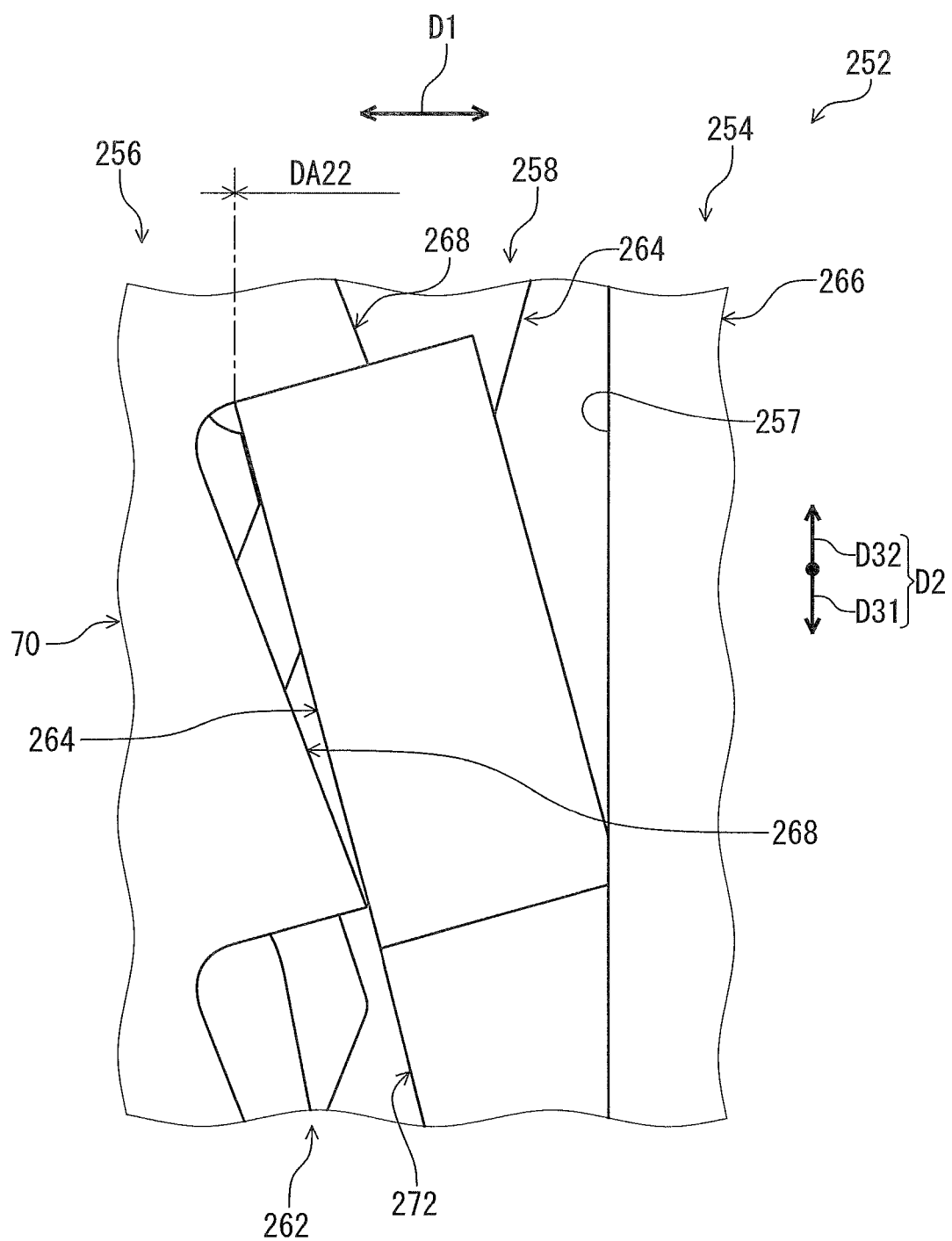
FIG. 28 is another partial enlarged front view of the rotational one-way clutch of the resistance applying structure of the bicycle derailleur illustrated in FIG. 23.
Figure 29:
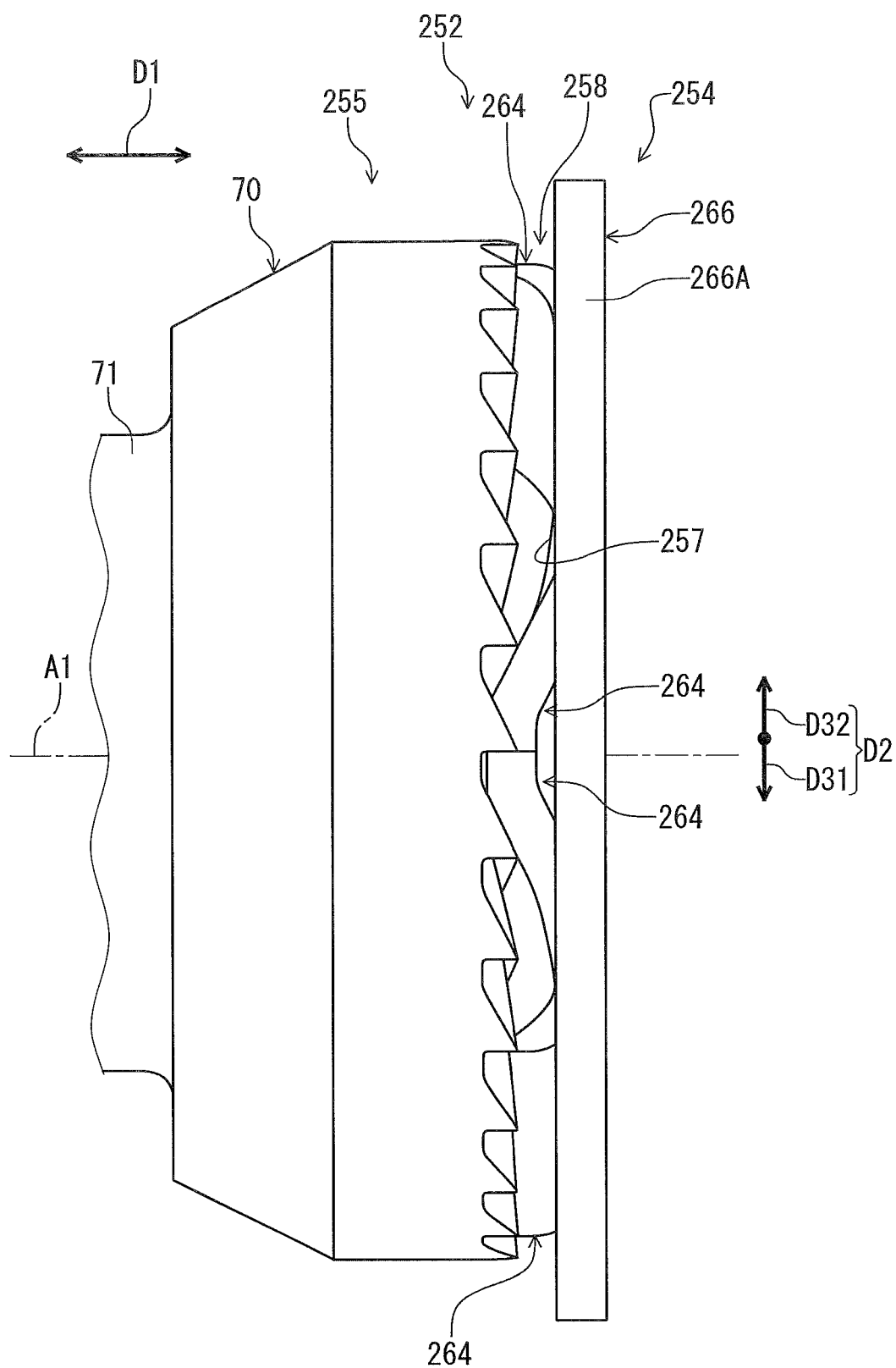
FIG. 29 is a partial front view of a rotational one-way clutch of a resistance applying structure of a bicycle derailleur in accordance with a modification of the second embodiment.

As seen in FIGS. 27 and 28, the at least one first engagement pawl 264 is elastically deformed by the at least one second engagement pawl 268 while the chain guide 16 (FIG. 23) rotates relative to the movable member 14 in the first rotational direction D31 about the pivot axis A1. As seen in FIG. 27, the at least one first engagement pawl 264 is elastically deformed by a first deformation amount DA21 in the axial direction D1 while the chain guide 16 (FIG. 23) rotates relative to the movable member 14 in the first rotational direction D31 about the pivot axis A1. As seen in FIG. 28, the at least one first engagement pawl 264 is elastically deformed by a second deformation amount DA22 in the axial direction D1 while the chain guide 16 (FIG. 23) rotates relative to the movable member 14 in the second rotational direction D32 about the pivot axis A1. In this embodiment, the first deformation amount DA21 is larger than the second deformation amount DA22. The second deformation amount DA22 can be 0 mm. However, the first deformation amount DA21 and the second deformation amount DA22 are not limited to this embodiment and the above ranges. The first engagement pawl 264 can have a curved shape illustrated in FIG. 29.

With the bicycle derailleur 210, it is possible to obtain substantially the same effect as that of the first embodiment.

Modifications

Figure 30:
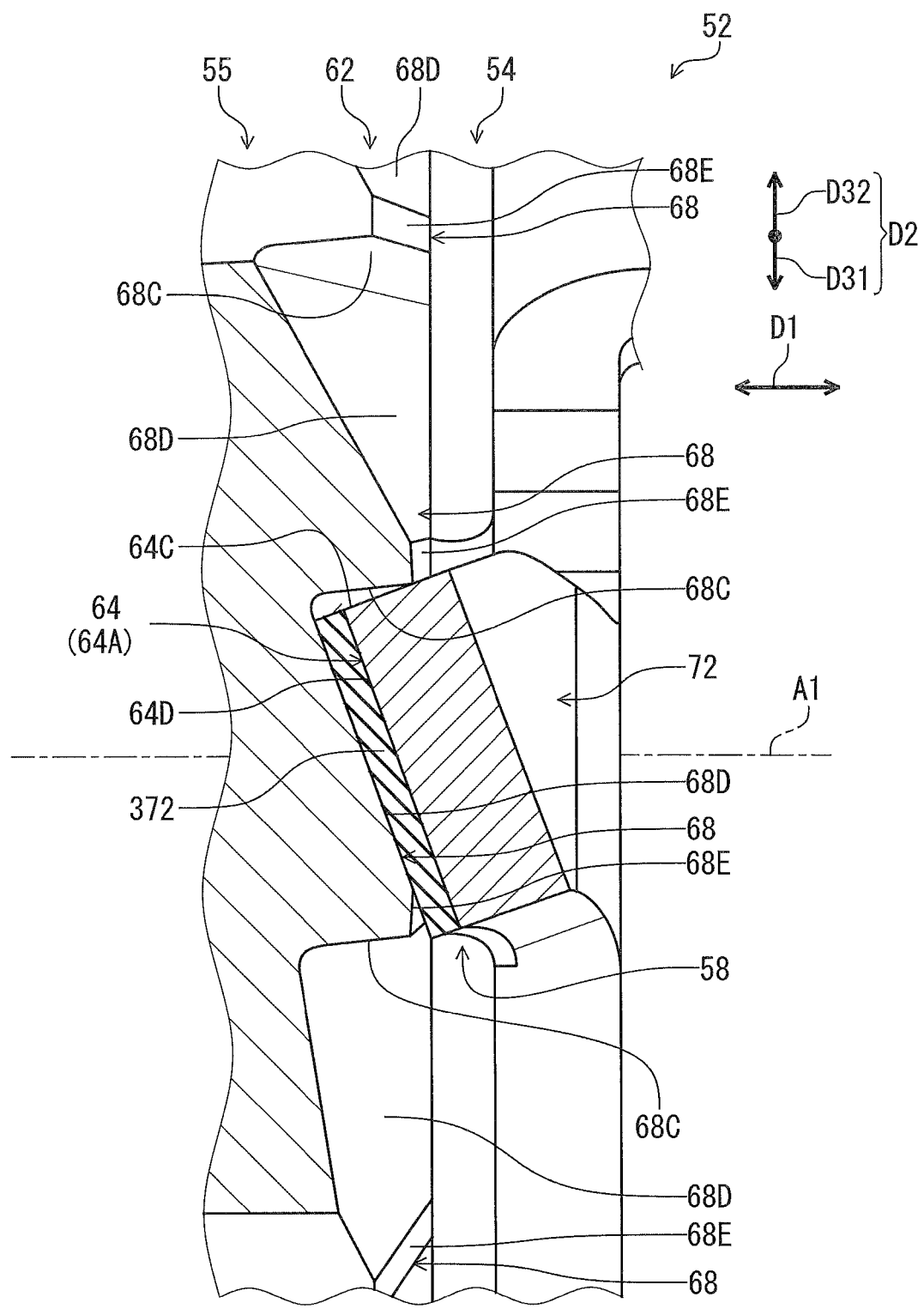
FIG. 30 is a cross-sectional view of a rotational one-way clutch of a resistance applying structure of a bicycle derailleur in accordance with a modification.

In the first embodiment, the elastic portion 72 is integrally provided with the first engagement pawl 64 as a one-piece unitary member. As seen in FIG. 30, however, the rotational one-way clutch 52 can include an elastic portion 372 which is a separate member from the first engagement pawl 64 and the second engagement pawl 68 instead of or in addition to the elastic portion 72. In this modification, the elastic portion 372 is provided to the first engagement profile 58 of the first engagement member 54. The elastic portion 372 is made of a non-metallic material such as an elastic material (e.g., rubber) and is attached to the first engagement pawl 64. The elastic portion 372 is provided on the first axial surface 64D of the first engagement pawl 64 and is contactable with the second axial surface 68D of the second engagement pawl 68. This modification can apply to the elastic portion 272 of the second embodiment.

Figure 31:
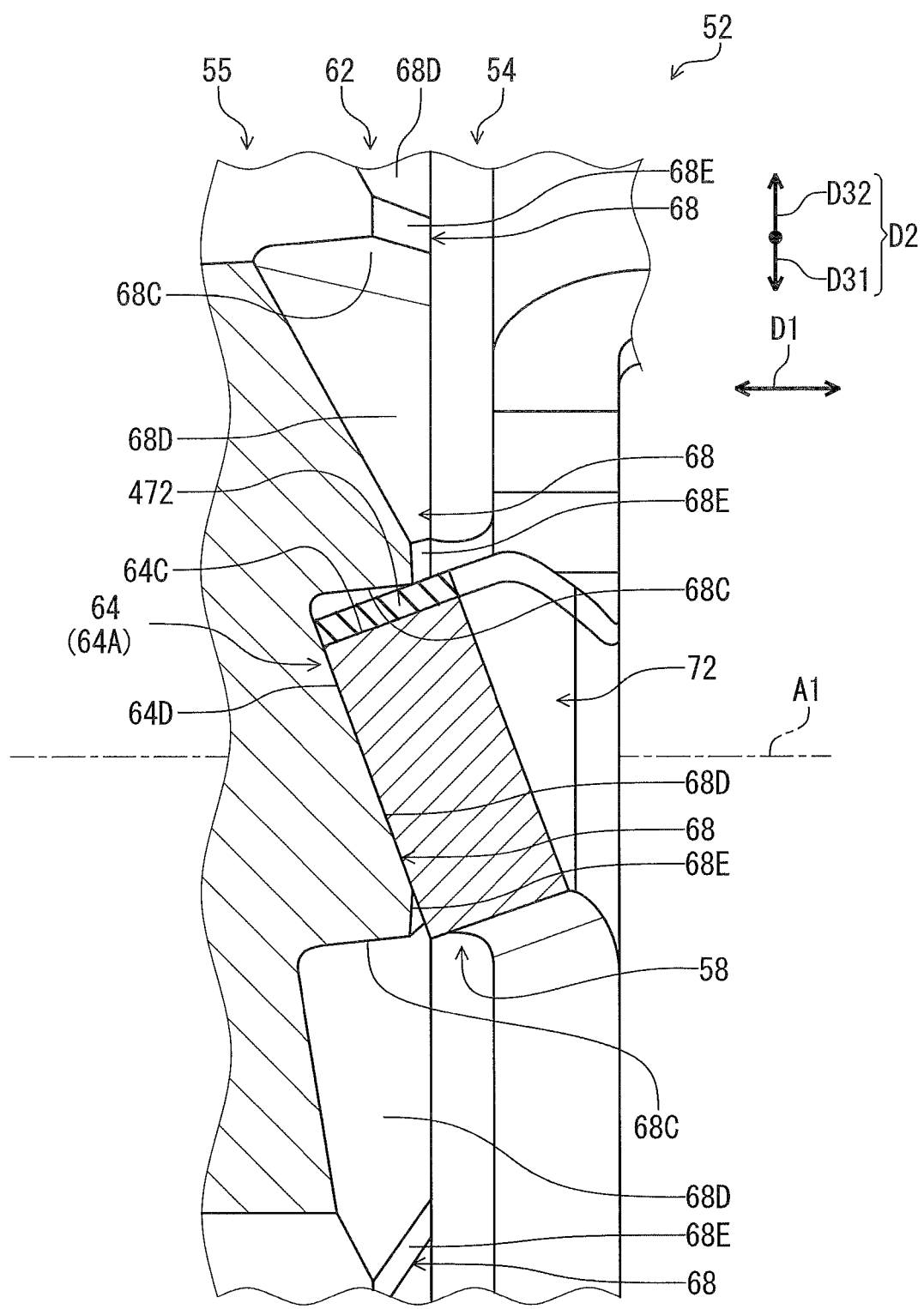
FIG. 31 is a cross-sectional view of a rotational one-way clutch of a resistance applying structure of a bicycle derailleur in accordance with another modification.

As seen in FIG. 31, the rotational one-way clutch 52 can include an elastic portion 472 which is a separate member from the first engagement pawl 64 and the second engagement pawl 68 instead of or in addition to the elastic portion 72. In this modification, the elastic portion 372 is provided to the first engagement profile 58 of the first engagement member 54. The elastic portion 472 is made of a non-metallic material such as an elastic material (e.g., rubber) and is attached to the first engagement pawl 64. The elastic portion 472 is provided on the first circumferential surface 64C of the first engagement pawl 64 and is contactable with the second circumferential surface 68C of the second engagement pawl 68. This modification can apply to the elastic portion 272 of the second embodiment. Furthermore, this modification can be combined with the modification illustrated in FIG. 30.

Figure 32:
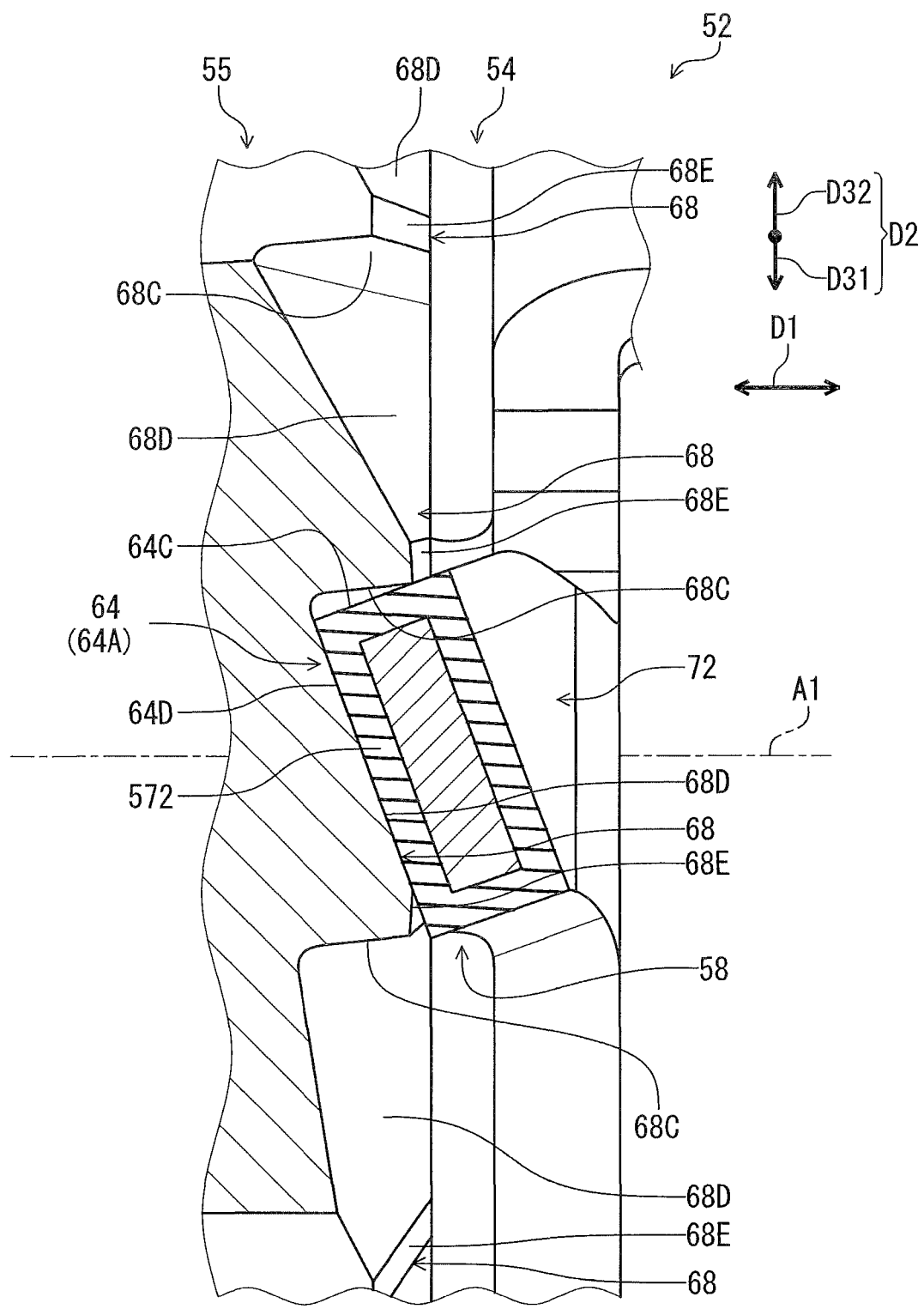
FIG. 32 is a cross-sectional view of a rotational one-way clutch of a resistance applying structure of a bicycle derailleur in accordance with another modification.

As seen in FIG. 32, the rotational one-way clutch 52 can include an elastic portion 572 which is a separate member from the first engagement pawl 64 and the second engagement pawl 68 instead of or in addition to the elastic portion 72. In this modification, the elastic portion 372 is provided to the first engagement profile 58 of the first engagement member 54. The elastic portion 572 is made of a non-metallic material such as an elastic material (e.g., rubber) and is attached to the first engagement pawl 64. The elastic portion 572 is provided on the first circumferential surface 64C and the first axial surface 64D of the first engagement pawl 64 and is contactable with the second circumferential surface 68C and the second axial surface 68D of the second engagement pawl 68. The elastic portion 572 is attached to the first engagement pawl 64 to surround the first engagement pawl 64. This modification can apply to the elastic portion 272 of the second embodiment.

Figure 33:
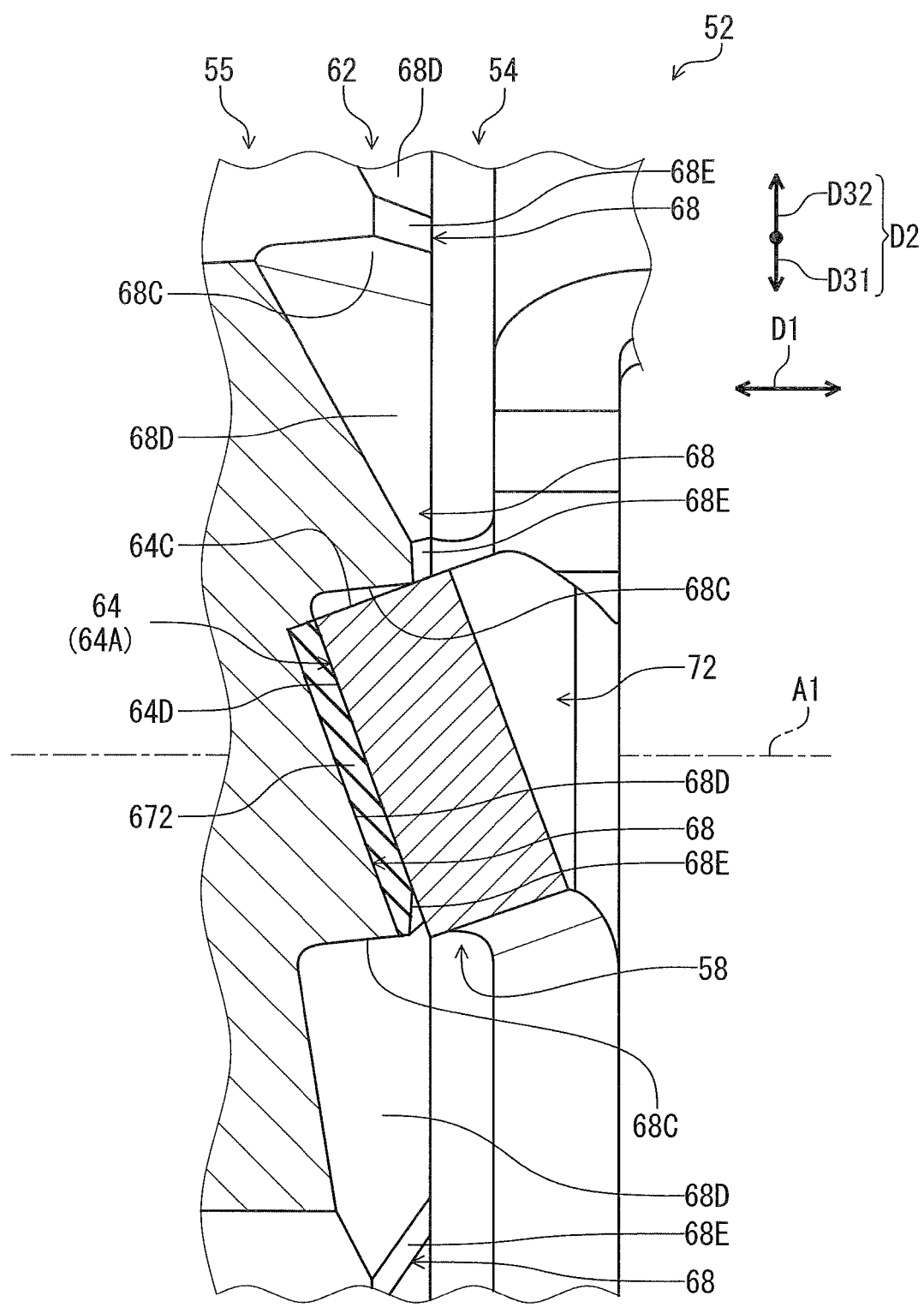
FIG. 33 is a cross-sectional view of a rotational one-way clutch of a resistance applying structure of a bicycle derailleur in accordance with another modification.

In the first embodiment, the elastic portion 72 is provided to the first engagement profile 58 of the first engagement member 54. As seen in FIG. 33, however, the elastic portion 72 can be provided to the second engagement profile 62 of the second engagement member 55. The rotational one-way clutch 52 can include an elastic portion 672 which is a separate member from the first engagement pawl 64 and the second engagement pawl 68 instead of or in addition to the elastic portion 72. In this modification, the elastic portion 672 is provided to the second engagement profile 62 of the second engagement member 55. The elastic portion 672 is made of a non-metallic material such as an elastic material (e.g., rubber) and is attached to the second engagement pawl 68. The elastic portion 672 is provided on the second axial surface 68D of the second engagement pawl 68 and is contactable with the first axial surface 64D of the first engagement pawl 64. This modification can apply to the elastic portion 272 of the second embodiment.

Figure 34:
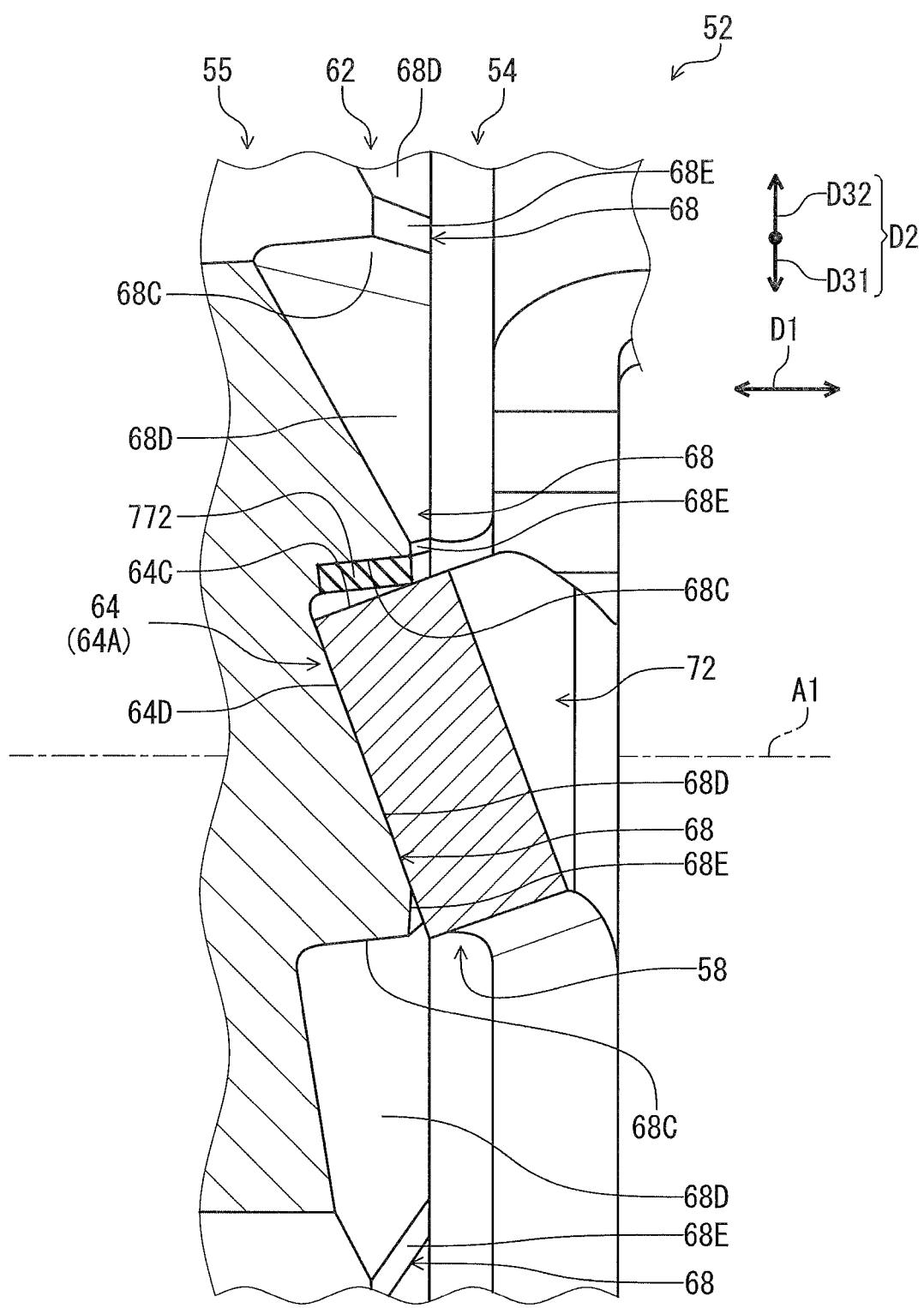
FIG. 34 is a cross-sectional view of a rotational one-way clutch of a resistance applying structure of a bicycle derailleur in accordance with another modification.

As seen in FIG. 34, the rotational one-way clutch 52 can include an elastic portion 772 which is a separate member from the first engagement pawl 64 and the second engagement pawl 68 instead of or in addition to the elastic portion 72. In this modification, the elastic portion 772 is provided to the second engagement profile 62 of the second engagement member 55. The elastic portion 772 is made of a non-metallic material such as an elastic material (e.g., rubber) and is attached to the second engagement pawl 68. The elastic portion 772 is provided on the second circumferential surface 68C of the second engagement pawl 68 and is contactable with the first circumferential surface 64C of the first engagement pawl 64. This modification can apply to the elastic portion 272 of the second embodiment. Furthermore, this modification can be combined with the modification illustrated in FIG. 33.

Figure 35:
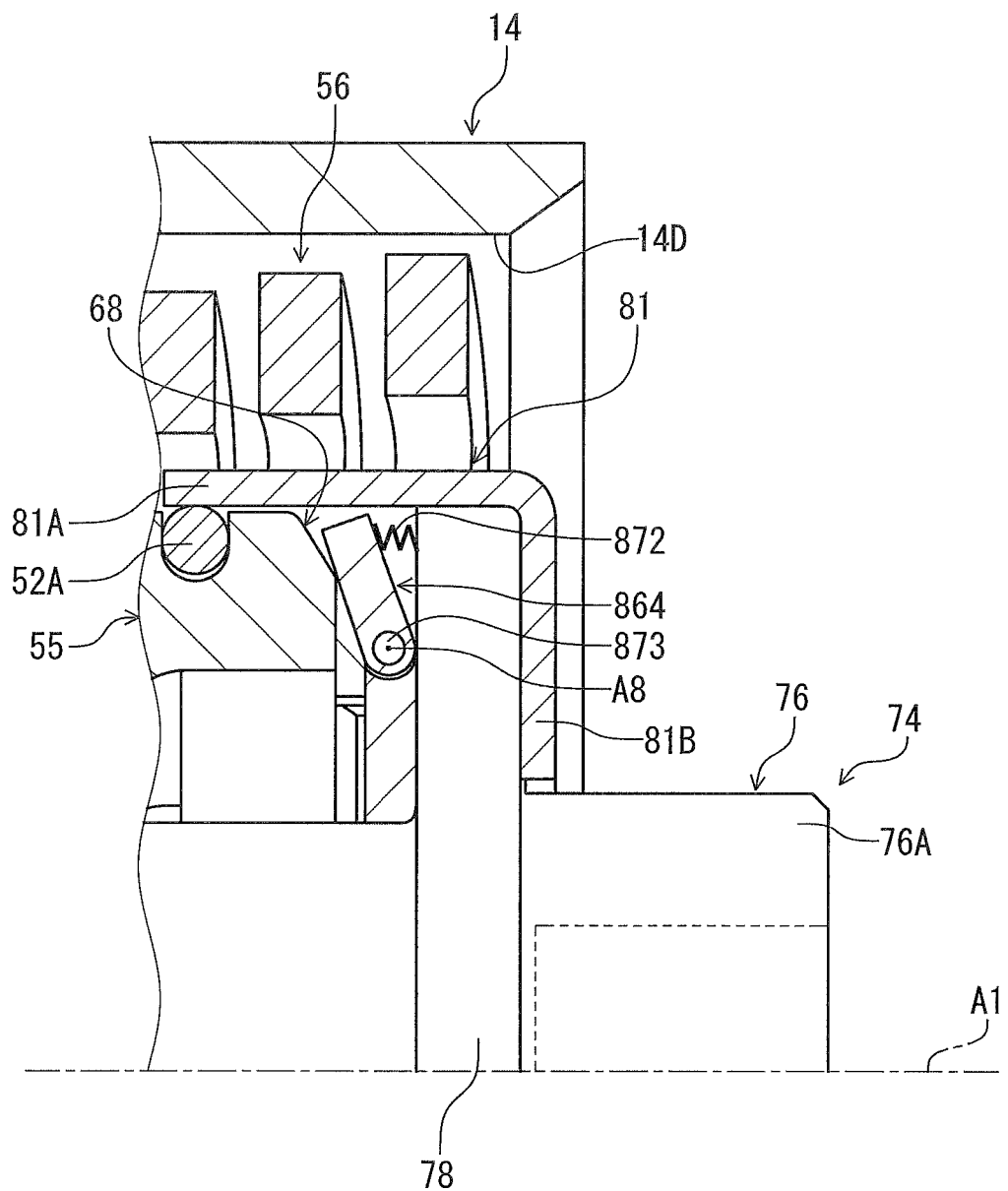
FIG. 35 is a cross-sectional view of a resistance applying structure of a bicycle derailleur in accordance with another modification.

As seen in FIG. 35, the rotational one-way clutch 52 can include an elastic portion 872 instead of the elastic portion 72 of the first embodiment. The elastic portion 872 is provided to the first engagement profile 58. The first engagement profile 58 includes at least one first engagement pawl 864. The first engagement pawl 864 is pivotally coupled to the first base body 66 about a pawl pivot axis A8. The first engagement pawl 864 is pivotally coupled to the first base body 66 with a pawl pivot pin 873. The elastic portion 872 is provided between the first engagement pawl 864 and the flange 78 of the pivot shaft 74 to bias the first engagement pawl 864 to the second engagement pawl 68 of the second engagement member 55. For example, the elastic portion 872 includes a coiled spring. However, the elastic portion 872 can include other members such as rubber.

In the first embodiment, the second engagement profile 62 does not include an elastic portion. However, the second engagement profile 62 can include an elastic portion provided to the second engagement pawl 68. For example, the second engagement pawl 68 can have a shape identical or substantially identical to the first engagement pawl 64.

In the above embodiments, the bicycle derailleur 10 or 210 is configured to be connected to the bicycle operating device 2 with the control cable 4. However, each of the bicycle derailleurs 10 and 210 can be configured to be wirelessly connected to the bicycle operating device 2. In such embodiments, a wireless communicator is mounted to one of the base member 12, the movable member 14, and the linkage structure 20. A battery is mounted to one of the base member 12, the movable member 14, the linkage structure 20, and the bicycle frame BF. A controller is mounted to one of the base member 12, the movable member 14, the linkage structure 20, and the bicycle frame BF. The wireless communicator, the battery, and the controller are connected to each other with a cable.

Figure 36:
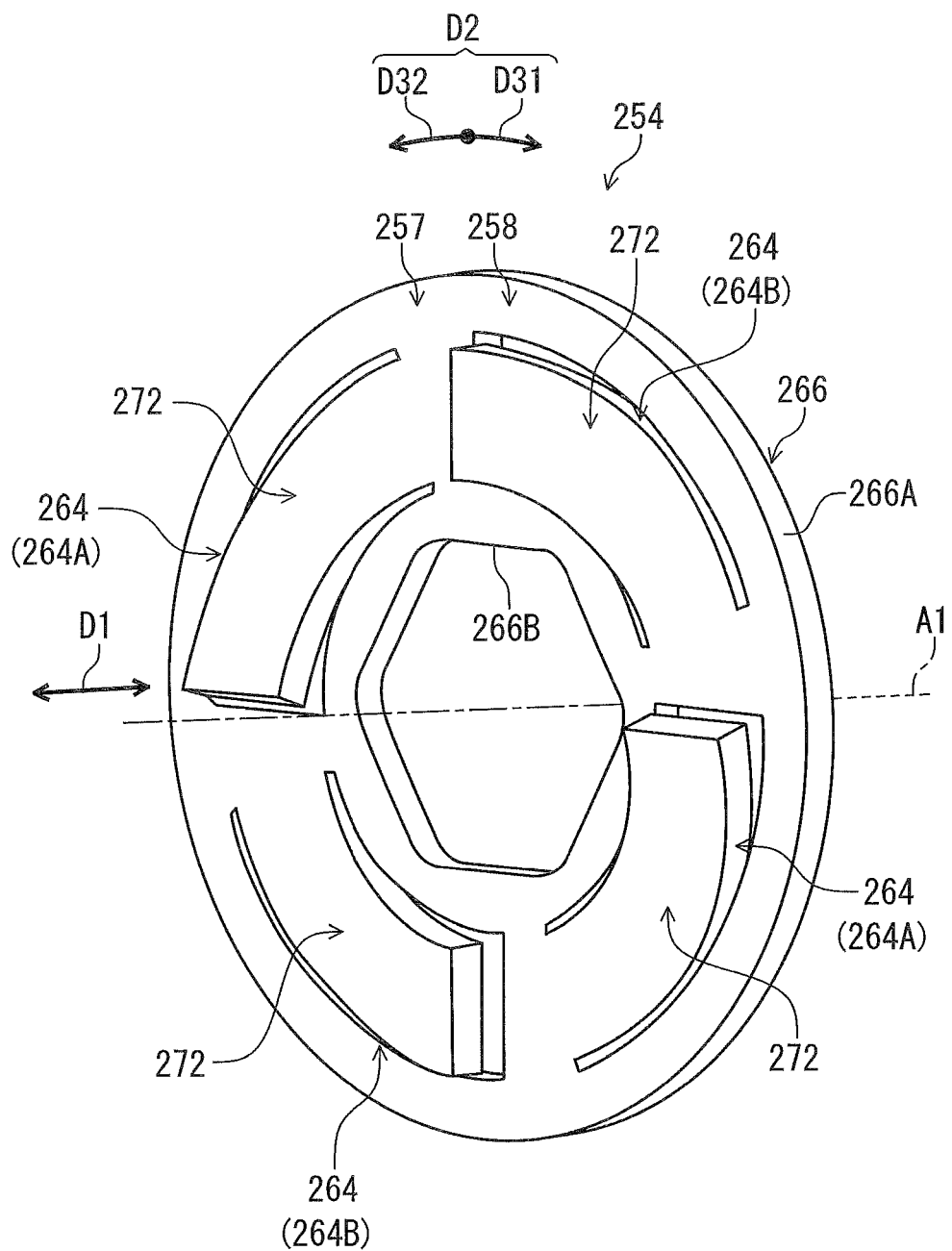
FIG. 36 is a perspective view of a first engagement member of a resistance applying structure of a bicycle derailleur in accordance with another modification.

In the second embodiment, the first engagement pawls 264 are separate members from the first base body 266. As seen in FIG. 36, however, at least one of the first engagement pawls 264 can be integrally provided with the first base body 266 as a one-piece unitary member.

The above embodiments and the modifications can be at least partly combined with each other if necessary and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
   a base member configured to be mounted to a bicycle frame;
   a movable member movably coupled to the base member;
   a chain guide rotatably coupled to the movable member about a pivot axis; and
   a resistance applying structure configured to apply rotational resistance to the chain guide, the resistance applying structure including:
   a rotational one-way clutch including a first engagement member and a second engagement member, the first engagement member and the second engagement member being configured to be rotatable about the pivot axis, the first engagement member having a first axially facing surface and a first engagement profile provided to the first axially facing surface, the second engagement member having a second axially facing surface and a second engagement profile provided to the second axially facing surface, the first engagement profile and the second engagement profile being configured to engage with each other in an engagement state of the first engagement member and the second engagement member, the first axially facing surface and the second axially facing surface being configured to face each other in an axial direction with respect to the pivot axis; and
   an elastic portion provided to at least one of the first axially facing surface of the first engagement member and the second axially facing surface of the second engagement member to make at least one of the first engagement profile and the second engagement profile elastically deformable in the axial direction.

2. The bicycle derailleur according to claim 1, wherein the first engagement profile includes at least one first engagement pawl,
   the second engagement profile includes at least one second engagement pawl configured to engage with the at least one first engagement pawl, and the elastic portion is provided to the at least one first engagement pawl.

3. The bicycle derailleur according to claim 2, wherein the at least one first engagement pawl includes a plurality of first engagement pawls.

4. A bicycle derailleur comprising:
a base member configured to be mounted to a bicycle frame;
a movable member movably coupled to the base member;
a chain guide rotatably coupled to the movable member about a pivot axis; and
a resistance applying structure configured to apply rotational resistance to the chain guide, the resistance applying structure including:
   a rotational one-way clutch including a first engagement member and a second engagement member, the first engagement member and the second engagement member being configured to be rotatable about the pivot axis, the first engagement member having a first axially facing surface and a first engagement profile provided to the first axially facing surface, the second engagement member having a second axially facing surface and a second engagement profile provided to the second axially facing surface, the first engagement profile and the second engagement profile being configured to engage with each other in an engagement state of the first engagement member and the second engagement member, the first axially facing surface and the second axially facing surface being configured to face each other in an axial direction with respect to the pivot axis; and
   an elastic portion provided to at least one of the first axially facing surface of the first engagement member and the second axially facing surface of the second engagement member, wherein
the first engagement profile includes at least one first engagement pawl,
the second engagement profile includes at least one second engagement pawl configured to engage with the at least one first engagement pawl,
the elastic portion is provided to the at least one first engagement pawl,
the at least one first engagement pawl includes a plurality of first engagement pawls,
at least one pawl of the plurality of first engagement pawls engages with the at least one second engagement pawl in the engagement state of the first engagement member and the second engagement member, and
another pawl of the plurality of first engagement pawls is free of an engagement with the at least one second engagement pawl in the engagement state of the first engagement member and the second engagement member.

5. The bicycle derailleur according to claim 2, wherein the at least one second engagement pawl includes a plurality of second engagement pawls.

6. A bicycle derailleur comprising:
a base member configured to be mounted to a bicycle frame;
a movable member movably coupled to the base member;
a chain guide rotatably coupled to the movable member about a pivot axis; and
a resistance applying structure configured to apply rotational resistance to the chain guide, the resistance applying structure including:
   a rotational one-way clutch including a first engagement member and a second engagement member, the first engagement member and the second engagement member being configured to be rotatable about the pivot axis, the first engagement member having a first axially facing surface and a first engagement profile provided to the first axially facing surface, the second engagement member having a second axially facing surface and a second engagement profile provided to the second axially facing surface, the first engagement profile and the second engagement profile being configured to engage with each other in an engagement state of the first engagement member and the second engagement member, the first axially facing surface and the second axially facing surface being configured to face each other in an axial direction with respect to the pivot axis; and
   an elastic portion provided to at least one of the first axially facing surface of the first engagement member and the second axially facing surface of the second engagement member, wherein
the first engagement profile includes at least one first engagement pawl,
the second engagement profile includes at least one second engagement pawl configured to engage with the at least one first engagement pawl,
the elastic portion is provided to the at least one first engagement pawl,
the at least one first engagement pawl includes a plurality of first engagement pawls,
the at least one second engagement pawl includes a plurality of second engagement pawls, and
a total number of the plurality of first engagement pawls is smaller than a total number of the plurality of second engagement pawls.

7. The bicycle derailleur according to claim 1, wherein the first engagement member has an annular shape, and the second engagement member has an annular shape.

8. The bicycle derailleur according to claim 1, wherein the first engagement profile includes a plurality of first engagement pawls, and
the plurality of first engagement pawls is spaced apart from each other in a circumferential direction with respect to the pivot axis.

9. The bicycle derailleur according to claim 8, wherein the plurality of first engagement pawls is equally spaced apart from each other in the circumferential direction with respect to the pivot axis.

10. The bicycle derailleur according to claim 9, wherein a total number of the plurality of first engagement pawls is an even number.

11. The bicycle derailleur according to claim 1, wherein the first engagement member includes a first base body including the first axially facing surface,
the first engagement profile includes at least one first engagement pawl, and
the at least one first engagement pawl is integrally provided with the first base body as a one-piece unitary member.

12. The bicycle derailleur according to claim 1, wherein the resistance applying structure includes a resistance applying member configured to apply rotational resistance to the second engagement member.

13. The bicycle derailleur according to claim 12, wherein the resistance applying structure includes a resistance control member configured to be operatively coupled to the resistance applying member so as to change the rotational resistance applied from the resistance applying member.

14. The bicycle derailleur according to claim 13, wherein
the resistance applying member is configured to apply first rotational resistance to the second engagement member in a first state where the resistance control member is in a first position, and the resistance applying member is configured to apply second rotational resistance to the second engagement member in a second state where the resistance control member is in a second position different from the first position, the second rotational resistance being different from the first rotational resistance.

15. The bicycle derailleur according to claim 13, wherein the resistance control member configured to gradually change the rotational resistance applied by the resistance applying member as a position of the resistance control member varies.

16. The bicycle derailleur according to claim 2, wherein the at least one first engagement pawl protrudes toward the second engagement member in the axial direction.

17. The bicycle derailleur according to claim 2, wherein the at least one first engagement pawl is elastically deformed by a first deformation amount in the axial direction while the chain guide rotates relative to the movable member in a first rotational direction about the pivot axis, the at least one first engagement pawl is elastically deformed by a second deformation amount in the axial direction while the chain guide rotates relative to the movable member in a second rotational direction about the pivot axis, the first rotational direction is a reverse direction of the second rotational direction in a circumferential direction with respect to the pivot axis, and the first deformation amount is larger than the second deformation amount.

18. The bicycle derailleur according to claim 17, wherein the at least one first engagement pawl is elastically deformed by the at least one second engagement pawl while the chain guide rotates relative to the movable member in the first rotational direction about the pivot axis.

19. The bicycle derailleur according to claim 2, wherein a total number of the at least one second engagement pawl is equal to or larger than 15 and is equal to or smaller than 40.

20. The bicycle derailleur according to claim 2, wherein a total number of the at least one first engagement pawl is equal to or larger than one and is equal to or smaller than eight.

* * * * *